US011545665B2

(12) United States Patent
Tabata et al.

(10) Patent No.: US 11,545,665 B2
(45) Date of Patent: *Jan. 3, 2023

(54) CARBON-POLYMER COMPLEX

(71) Applicant: Sony Corporation, Tokyo (JP)

(72) Inventors: Seiichiro Tabata, Tokyo (JP); Shinichiro Yamada, Tokyo (JP); Masayoshi Kanno, Tokyo (JP); Tsutomu Noguchi, Tokyo (JP); Takeshi Horie, Tokyo (JP)

(73) Assignee: Sony Corporation, Tokyo (JP)

( * ) Notice: Subject to any disclaimer, the term of this patent is extended or adjusted under 35 U.S.C. 154(b) by 201 days.

This patent is subject to a terminal disclaimer.

(21) Appl. No.: 16/900,268

(22) Filed: Jun. 12, 2020

(65) Prior Publication Data
US 2020/0313187 A1 Oct. 1, 2020

Related U.S. Application Data

(63) Continuation of application No. 12/308,161, filed as application No. PCT/JP2008/056752 on Apr. 4, 2008, now Pat. No. 10,714,750.

(30) Foreign Application Priority Data

Apr. 4, 2007 (JP) ................................. 2007-098421
Mar. 10, 2008 (JP) ................................. 2008-059052

(51) Int. Cl.
| H01M 4/587 | (2010.01) |
| C01B 32/30 | (2017.01) |
| C01B 32/318 | (2017.01) |
| C01B 32/324 | (2017.01) |
| C01B 32/354 | (2017.01) |
| H01G 11/34 | (2013.01) |
| H01G 11/24 | (2013.01) |
| B01J 20/28 | (2006.01) |
| H01M 4/583 | (2010.01) |
| B01J 20/20 | (2006.01) |
| C01B 32/00 | (2017.01) |
| C01B 32/336 | (2017.01) |
| H01M 4/02 | (2006.01) |
| H01M 10/0525 | (2010.01) |

(52) U.S. Cl.
CPC ............ *H01M 4/587* (2013.01); *B01J 20/20* (2013.01); *B01J 20/28033* (2013.01); *B01J 20/28059* (2013.01); *B01J 20/28061* (2013.01); *B01J 20/28071* (2013.01); *C01B 32/00* (2017.08); *C01B 32/30* (2017.08); *C01B 32/318* (2017.08); *C01B 32/336* (2017.08); *H01G 11/24* (2013.01); *H01G 11/34* (2013.01); *H01M 4/583* (2013.01); *C01P 2006/12* (2013.01); *C01P 2006/14* (2013.01); *H01M 10/0525* (2013.01); *H01M 2004/021* (2013.01); *H01M 2004/027* (2013.01); *H01M 2220/30* (2013.01); *Y02E 60/13* (2013.01)

(58) Field of Classification Search
None
See application file for complete search history.

(56) References Cited

U.S. PATENT DOCUMENTS

| 4,681,764 | A | 7/1987 | Endo et al. |
| 5,064,805 | A | 11/1991 | Otowa |
| 5,306,675 | A | * 4/1994 | Wu .......................... B01J 21/18 |
| | | | 34/259 |
| 5,356,852 | A | * 10/1994 | DeLiso ............. B01J 20/28026 |
| | | | 428/116 |
| 5,710,092 | A | 1/1998 | Baker |
| 5,834,138 | A | 11/1998 | Yamada et al. |
| 5,972,536 | A | 10/1999 | Yamada et al. |
| 6,060,424 | A | 5/2000 | Alford |
| 6,114,280 | A | 9/2000 | Stephens |

(Continued)

FOREIGN PATENT DOCUMENTS

| CN | 1152372 A | 6/1997 |
| CN | 1203887 A | 1/1999 |

(Continued)

OTHER PUBLICATIONS

Fey, George Ting-Kuo, and Chung-Lai Chen. "High-capacity carbons for lithium-ion batteries prepared from rice husk." Journal of power sources 97 (2001): 47-51. (Year: 2001).*

Baker, F.S., et al. "Carbon, Activated." in Kirk-Othmer Encyclopedia of Chemical Technology (2003) 741-761. (Year: 2003).*

Office Action from Japanese Application No. 2008-059052, dated Jul. 6, 2010.

(Continued)

*Primary Examiner* — Bethany P Barham
*Assistant Examiner* — Peter Anthopolos
(74) *Attorney, Agent, or Firm* — K&L Gates LLP

(57) ABSTRACT

A carbon-polymer complex is provided and includes a porous carbon material and a binder, wherein the porous carbon material includes a material obtained from carbonization of a raw material including rice husk, the raw material having a silicon content of at least 5 wt %, the raw material is heat treated before carbonization, and the raw material is treated by an alkali treatment after carbonization to reduce the silicon content, the porous carbon material having a specific surface area of at least 10 m$^2$/g as measured by the nitrogen BET method, a pore volume of at least 0.1 cm$^3$/g as measured by the BJH method and MP method, and an R value of 1.5 or greater, wherein the porous carbon material includes mesopores having pore sizes from 2 nm to 50 nm and obtained from the alkali treatment of the raw material after carbonization, the porous carbon material further includes macropores and micropores.

14 Claims, 10 Drawing Sheets

(56) References Cited

U.S. PATENT DOCUMENTS

| | | | |
|---|---|---|---|
| 6,303,249 | B1 | 10/2001 | Sonobe et al. |
| 6,391,429 | B1 | 5/2002 | Senkus et al. |
| 9,782,743 | B2 * | 10/2017 | Iida .................... B01J 20/28088 |
| 10,226,752 | B2 * | 3/2019 | Iida .................... B01J 20/28085 |
| 10,714,750 | B2 * | 7/2020 | Tabata ............... B01J 20/28061 |
| 10,756,346 | B2 * | 8/2020 | Tabata .................... H01G 11/24 |
| 2005/0129604 | A1 | 6/2005 | Pak et al. |
| 2007/0122334 | A1 | 5/2007 | Pak et al. |
| 2007/0123420 | A1 | 5/2007 | Hayashi et al. |
| 2010/0069507 | A1 | 3/2010 | Tabata et al. |

FOREIGN PATENT DOCUMENTS

| | | |
|---|---|---|
| JP | S47-012104 B1 | 4/1972 |
| JP | S53-1194 A | 1/1978 |
| JP | S56-73542 A | 6/1981 |
| JP | S62-11611 A | 1/1987 |
| JP | H02-54866 A | 2/1990 |
| JP | H03-223105 A | 10/1991 |
| JP | H05-139712 A | 6/1993 |
| JP | H06-191962 A | 7/1994 |
| JP | H06-293576 A | 10/1994 |
| JP | H07-155589 A | 6/1995 |
| JP | H07-230803 A | 8/1995 |
| JP | H07-230804 A | 8/1995 |
| JP | H09-161801 A | 6/1997 |
| JP | H10-21919 A | 1/1998 |
| JP | 2001-089119 A | 4/2001 |
| JP | 2002-126516 A | 5/2002 |
| JP | 2002-128514 A | 5/2002 |
| JP | 2002-362915 A | 12/2002 |
| JP | 2003-104710 A | 4/2003 |
| JP | 3565994 B2 | 9/2004 |
| JP | 2005-154268 A | 6/2005 |
| JP | 2005-262324 A | 9/2005 |
| JP | 2005-296933 A | 10/2005 |
| JP | 3719790 B2 | 11/2005 |
| JP | 2006-032166 A | 2/2006 |
| JP | 2006-056750 A | 3/2006 |
| JP | 2006-513846 A | 4/2006 |
| JP | 2006-331823 A | 12/2006 |
| JP | 2007-149636 A | 6/2007 |
| JP | 2007-246378 A | 9/2007 |
| JP | 2007-529403 A | 10/2007 |
| JP | 2007-284337 A | 11/2007 |
| JP | 2008-273816 A | 11/2008 |
| JP | 5152275 B2 | 2/2013 |
| JP | 5152276 B2 | 2/2013 |
| WO | 95/23762 A1 | 9/1995 |
| WO | 96/27911 A1 | 9/1996 |
| WO | 00/16896 A1 | 3/2000 |

OTHER PUBLICATIONS

Office Action from Japanese Application No. 2010-190421, dated Mar. 21, 2012.
Office Action from Japanese Application No. 2012-036046, dated Sep. 17, 2013.
Office Action from Korean Application No. 10-2008-7029509, dated Apr. 30, 2014.
Reasons for refusal notice issued in connection with Japanese Patent Application No. 2013-236513, dated Jan. 6, 2015 (4 pages).
Japanese Office Action dated Jun. 2, 2015, for corresponding Japanese Appln. No. 2013-236513 (3 pages).
Chinese Office Action dated Aug. 5, 2015, for corresponding Chinese Appln. No. 20140128813.9 (8 pages).
Extended European Search Report issued in EP Application 15189534.9, dated Mar. 10, 2016, 7 pages.
Japanese Office Action dated May 31, 2016 in corresponding Japanese application No. 2015-149101 (5 pages).
Hu, Zhonghua, Madapusi P. Srinivasan, and Yaming Ni. "Preparation of Mesoporous High-Surface-Area Activated Carbon." Advanced materials 12.1 (2000): 62-65.
Y. Liu, J. S. Xue, T. Zheng, and J. R. Dahn, "Mechanism of Lithius Insertion in Hard Carbons Prepared by Pyrolysis of Epoxy Resins" 34, 193 (1996).
Weibing Xing, J.S. Xue, Tao Zheng, A. Gibaud, and J.R. Dahn "Correlation Between Lithium Intercalation Capacity and Microstructure in Hard Carbons" vol. 143, No. 11, Nov. 1996.
Baker, F. S., Miller, C. E., Repik, A. J. and Tolles, E. D. 2003. Carbon, Activated. Kirk-Othmer Encyclopedia of Chemical Technology.
Dahn, J. R., W. Xing, and Y. Gao. "The 'falling cards model' for the structure of microporous carbons." Carbon 35.6 (1997): 825-830.
Henning, K.-D. and von Kienle, H. 2010. Carbon, 5. Activated Carbon. Ullmann's Encyclopedia of Industrial Chemistry.
Search Report for related European Application No. 15189534.9; report dated Aug. 2, 2017; 7 pages.
T. Wigmans; "Industrial Aspects of Production and Use of Activated Carbons"; Carbon, vol. 27. No 1. pp. 13-22; Great Britain; 1989; 10 pages.
Japan Patent Office, Office Action issued in Japanese Patent Appln. No. 2016-189558 (related to above-captioned patent application), dated Nov. 14, 2017.
Office Action issued in connection with Japanese Patent Application No. 2016189558, dated Feb. 13, 2018. (6 pages).
Halper, Marin S., and James C. Ellenbogen. "Supercapacitors: A brief overview." MITRE Nanosystems Group (Mar. 2006).
European Office Action dated Jul. 31, 2018 in corresponding European Application No. 15 189 534.9.
Khalfaoui, Brahim, Abdessalem H. Meniai, and Rafel Borja. "Removal of copper from industrial wastewater by raw charcoal obtained from reeds." Journal of Chemical Technology & Biotechnology 64.2 (1995): 153-156.
Wang, Shaobin, and GQ Max Lu. "Effects of acidic treatments on the pore and surface properties of Ni catalyst supported on activated carbon." Carbon 36.3 (1998): 283-292.
European Office Action dated Feb. 25, 2020 in corresponding European Application No. 15 189 534.9.
Fey, George Ting-Kuo, and Chung-Lai Chen. "High-capacity carbons for lithium-ion batteries prepared from rice husk." Journal of power sources 97 (2001): 47-51.
Wigmans et al: "Industrial aspects of production and use of activated carbons", Carbon, Elsevier, Oxford, GB, vol. 27, No. 1, Jan. 1, 1989 (Jan. 1, 1989), pp. 13-22, XP025444720, ISSN: 0008-6223, DOI: 10.1016/0008-6223(89)90152-8 [retrieved on Jan. 1, 1989].

* cited by examiner (A)

(B)

(A)

(B)

(A)

(B)

(A)

(B)

(A)

(B)

CARBON-POLYMER COMPLEX

CROSS-REFERENCE TO RELATED APPLICATIONS

The present application is a continuation of U.S. application Ser. No. 12/308,161, filed Oct. 21, 2009, which claims the benefit of International Application No. PCT/JP2008/056752, filed Apr. 4, 2008, which claims priority to Japanese Application No. 2008-059052, filed Oct. 3, 2008, and claims priority to Japanese Application No. 2007-098421, filed Apr. 4, 2007, the disclosures of which are hereby incorporated by reference herein.

BACKGROUND OF THE INVENTION

This invention relates to porous carbon materials making use of plant-derived materials as raw materials and their production process, and also to adsorbents, masks, adsorbing sheets and carriers.

BACKGROUND ART

In recent years, portable electronic equipment such as camera-integrated VTRs (Video Tape Recorders), digital still cameras, cell phones, portable information terminals and notebook-size personal computers are widely prevalent, and their size reduction, weight reduction and life prolongation are strongly desired. Keeping in step with this desire, developments are under way for batteries, especially secondary batteries having light weight and permitting the provision of high energy density as power supplies for portable electronic equipment.

Among these, secondary batteries, which employ lithium as an electrode reactant in a charge-discharge reaction and use its occlusion and release (so-called lithium ion secondary batteries), are highly prospective because they provide large energy density compared with lead batteries and nickel-cadmium batteries. In these lithium ion secondary batteries, carbon materials are extensively used as anode active materials at anodes (see, for example, Japanese Patent Laid-Open No. Sho 62-090863). Employed as such carbon materials to keep production costs low and to provide improved battery characteristics are, for example, cokes such as pitch coke, needle coke and petroleum coke and baked products of organic high-molecular compounds as obtained by baking and carbonizing furan resins, natural high-molecular materials and the like at appropriate temperatures (see, for example, Japanese Patent Laid-Open No. Hei 4-308670). Further, a technology that bakes an organic high-molecular compound to produce a porous carbon material having three-dimensional regularity is disclosed, for example, in Japanese Patent Laid-Open No. 2005-262324, which also suggests that the porous carbon material is usable as an anode active material.

Further, carbon materials obtained by baking crystalline celluloses are also used as anode active materials as such crystalline celluloses vary less in crystalline degree in comparison with synthesized high-molecular compounds (see, for example, Japanese Patent Laid-Open No. Hei 2-054866). These carbon materials can obtain large charge capacity compared with cokes. In the carbon materials obtained by baking the crystalline celluloses, however, occluded lithium ions are not readily releasable. High charging efficiency is, therefore, hardly available, resulting in the observation of a tendency that as a whole battery, the energy density becomes smaller.

Unused parts of plants such as vegetables and cereals are mostly discarded. Effective utilization of these unused parts is, however, strongly demanded for the preservation and improvement of the global environment. As one example of the effective utilization of such unused parts, carbonization treatment can be mentioned. It is also investigated to use, as an anode active material for lithium ion secondary batteries, a carbon material produced by carbonizing such a plant-derived material (see, for example, Japanese Patent No. 3565994, Japanese Patent No. 3719790, and PCT Patent Publication No. WO 96/27911).

Further, for patients suffering from a liver disease or kidney disease, the elimination of toxic substances by hemodialysis is performed. However, hemodialysis requires a special system and an expert technician, and moreover, gives physical and/or mental discomfort or pain to patients. Under such a background, oral adsorbents made of activated carbon and having high safety and stability to the body, such as KREMEZIN, are attracting attention (see Japanese Patent Publication No. Sho 62-11611). In addition, anti-obesity agents, antidiabetic agents, anti-inflammatory bowel disease agents, purine adsorbents and the like, which make use of activated carbon, have also been proposed. Applications, research and developments of activated carbon in the medical field are extensively under way.

In addition, to make a drug to effectively act in the body, it is desired to allow an appropriate amount of the drug to act for an adequate time. For this purpose, it is preferred to use a carrier that can control the release rate of the drug. Adsorption of the drug on such a carrier makes it possible to continuously release the drug at a predetermined constant level. Such a drug-carrier complex can be used, for example, as a transdermal preparation having transdermal absorbability and topical action that deliver the drug through the skin, or as an oral preparation. The carrier is composed, for example, of carbon having nontoxicity and chemical resistance, an inorganic material such as alumina or silica, or an organic material such as cellulose or polyethylene oxide. In recent years, however, some examples making use of carbon materials as carriers have been reported (see, for example, Japanese Patent Laid-Open No. 2005-343885). There are also reports on the sustained release of fertilizer by the use of activated carbon (see, for example, Japanese Patent No. 3694305).

SUMMARY OF THE INVENTION

Nonetheless, the technologies for subjecting plant-derived materials to carbonization treatment are not considered to be sufficient, and for produced carbon materials, still further improvements are desired in functionality. When plant-derived carbon materials are used in electrochemical devices such as batteries like lithium ion secondary batteries or electric double layer capacitors, however, sufficient characteristics are hardly considered to be obtainable. There is, accordingly, an outstanding strong desire for a carbon material capable of exhibiting still better characteristics when employed in electrochemical devices. There are also outstanding strong desires for the development of porous carbon materials for adsorbents orally administrable in kidney diseases and liver diseases, the development of porous carbon materials for the purpose of adsorption of a protein or virus that gives deleterious effects to the body or as medical adsorbent preparations having still better adsorption performance, and the development of porous carbon materials suited for use as carriers capable of adequately controlling the drug release rate.

An object of the present invention is, therefore, to provide a porous carbon material, which has high functionality, can obtain excellent characteristics when used, for example, in an electrochemical device such as a battery like a lithium ion secondary battery or an electric double layer capacitor, and is excellent in adsorption performance and drug release performance, and its production process, and an adsorbent, a mask, an adsorbing sheet and a carrier.

A porous carbon material according to the present invention to achieve the above-described objects, is obtainable from a plant-derived material having a silicon (Si) content of at least 5 wt % as a raw material, and has a value of specific surface area of at least 10 m$^2$/g as measured by the nitrogen BET method, a silicon (Si) content of at most 1 wt % and a pore volume of at least 0.1 cm$^3$/g as measured by the BJH method and MP method.

In the porous carbon material according to the present invention, it may be preferred, but is not limited to, that the content of magnesium (Mg) is at least 0.01 wt % but at most 3 wt %, the content of potassium (K) is at least 0.01 wt % but at most 3 wt %, and the content of calcium (Ca) is at least 0.05 wt % but at most 3 wt %.

A process according to the present invention for producing a porous carbon material from a plant-derived material as a raw material to achieve the above-described object comprises carbonizing the plant-derived material at 800° C. to 1,400° C. and then applying a treatment with an acid or alkali.

The term "carbonizing" or "carbonization" as used herein generally means to subject an organic substance (a "plant-derived material" in the present invention) to heat treatment to convert it into a carbonaceous material (see, for example, JIS M 0104-1984). It is to be noted that as an atmosphere for carbonization, an oxygen-free atmosphere can be mentioned. Specifically, a vacuum atmosphere, an inert gas atmosphere such as nitrogen gas or argon gas, or an atmosphere that brings a plant-derived material into such a form as if it has been roasted in a covered pan can be mentioned. As a ramp-up rate to a carbonization temperature, 1° C./min or higher, preferably 3° C./min or higher, more preferably 5° C./min or higher, each under such an atmosphere, can be mentioned. As an upper limit to the carbonization time, on the other hand, 10 hours, preferably 7 hours, more preferably 5 hours can be mentioned, although the upper limit is not limited to such time. A lower limit to the carbonization time can be the time in which the plant-derived material can be surely carbonized. Further, the plant-derived material may be ground into a desired particle size as desired, and in addition, classification may be conducted. Furthermore, the plant-derived material may be washed beforehand.

In the process according to the present invention for the production of the porous carbon material, the process may be practiced in such an embodiment that activation treatment is applied subsequent to the treatment with the acid or alkali. This embodiment can increase micropores (to be described subsequently herein) the pore sizes of which are smaller than 2 nm. As an activation treatment method, a gas activation method or a chemical activation method can be mentioned. The term "gas activation method" as used herein means a method that oxygen, steam, carbon dioxide gas, air or the like is used as an activator and a porous carbon material is heated in such an atmosphere at 700° C. to 1,000° C. for several tens minutes to several hours to develop a microstructure by volatile components and carbon molecules in the porous carbon material. It is to be noted that the heating temperature may be chosen as desired based on the kind of the plant-derived material, the kind and concentration of the gas, and so on. Preferably, however, the heating temperature may be at least 800° C. but at most 950° C. The term "chemical activation method" as used herein, on the other hand, means a method that activation is effected using zinc chloride, iron chloride, calcium phosphate, calcium hydroxide, magnesium carbonate, potassium carbonate, sulfuric acid or the like in place of oxygen or steam employed in the gas activation method, washing is conducted with hydrochloric acid, the pH is adjusted with an aqueous alkaline solution, and drying is performed.

In the process according to the present invention, including the above-described preferred embodiments, for the production for the porous carbon material, silicon components in the plant-derived material after its carbonization are removed by the treatment with the acid or alkali. Here, as the silicon components, oxidized silicon compounds such as silicon dioxides, silicon oxide and silicon oxide salts can be mentioned.

In the process according to the present invention, including the above-described preferred embodiments and features, for the production for the porous carbon material, the process may feature that the content of silicon (Si) in the plant-derived material is at least 5 wt % and that in the porous carbon material, the value of specific surface area is at least 10 m$^2$/g as measured by the nitrogen BET method, the content of silicon (Si) is at most 1 wt %, and the volume of pores is at least 0.1 cm$^3$/g as measured by the BJH method and MP method. Further, in the process according to the present invention, including these preferred embodiments and features, for the production for the porous carbon material, it may be preferred that in the porous carbon material, the content of magnesium (Mg) is at least 0.01 wt % but at most 3 wt %, the content of potassium (K) is at least 0.01 wt % but at most 3 wt %, and the content of calcium (Ca) is at least 0.05 wt % but at most 3 wt %. Furthermore, in the process according to the present invention, including the above-described preferred embodiments and features, for the production for the porous carbon material, it may be preferred to apply a heat treatment (precarbonization treatment) to the plant-derived material at a temperature (for example, 400° C. to 700° C.) lower than a temperature for the carbonization in an oxygen-free state before the carbonization of the plant-derived material, although it depends on the plant-derived material employed. By the heat treatment, tar components which may be formed in the course of the carbonization can be extracted, and as a result, the tar components which may be formed in the course of the carbonization can be decreased or eliminated. It is to be noted that the oxygen-free state can be achieved, for example, by using an inert gas atmosphere such as nitrogen gas or argon gas, a vacuum atmosphere, or an atmosphere that brings a plant-derived material into such a form as if it has been roasted in a covered pan. Further, the plant-derived material may preferably be immersed, before its carbonization, in an alcohol (for example, methyl alcohol, ethyl alcohol or isopropyl alcohol) to decrease mineral components and water contained in the plant-derived material or to avoid the occurrence of an unpleasant smell in the course of the carbonization, although it depends on the plant-derived material to be employed. It is to be noted that the precarbonization treatment may be conducted after the immersion. As materials to which heat treatment may preferably be applied in an inert gas, plants that abundantly produce pyrolignous acid (tar and light-weight oil fractions) can be mentioned, for example. As materials to which the alcohol pretreatment may preferably be applied, on the other hand, seaweeds that abundantly contain iodine and various minerals can be mentioned, for example.

In the porous carbon material and its production process according to the present invention, including the above-described various preferred embodiments and features, grain husk or straw of rice (rice plant), barley, wheat, rye, barnyardgrass or foxtail millet, reed, or seaweed stem can be mentioned as the plant-derived material. However, the plant-derived material is not limited to such materials, and in addition to them, vascular plants, ferns and mosses which grow on land, algae, and seaweeds can also be mentioned, for example. It is to be noted that as a raw material, these materials may be used singly or plural ones of them may be used in combination. Further, no particular limitation is imposed on the shape or form of the plant-derived material. For example, grain husk or straw may be used as it is, or may be used in the form of a dried product. It is also possible to use one subjected to one or more of various treatments such as fermentation processing, roasting processing and extraction processing in the processing of food or beverage such as beer or liquor. Especially from the viewpoint of achieving the recycling of an industrial waste as a resource, it is preferred to use straw or grain hull after processing such as threshing. Straw or grain hull after such processing can be obtained in a large volume and with ease, for example, from agricultural cooperatives, brewing companies or food companies.

The porous carbon material and its production process according to the present invention, including the above-described various preferred embodiments and features, will collectively be called simply "the present invention" in the following description. Further, the porous carbon material according to the present invention, including the above-described various preferred embodiments and features, and the porous carbon materials obtained by the production process according to the present invention will collectively be called simply "the porous carbon material according to the present invention." Furthermore, the material obtained after carbonizing the plant-derived material at 800° C. to 1,400° C. but before applying the acid or alkali treatment will be called "the porous carbon material precursor" or "the carbonaceous material."

In the porous carbon material according to the present invention, nonmetal elements such as phosphorus (P) and sulfur (S) and metal elements such as transition elements may be contained. The content of phosphorus (P) can be at least 0.01 wt % but at most 3 wt %, while the content of sulfur (S) can be at least 0.01 wt % but at most 3 wt %. It is to be noted that the lower the contents of these elements and the above-mentioned magnesium (Mg), potassium (K) and calcium (Ca), the more preferred from the viewpoint of an increase in the value of specific surface area, although it differs depending on the application of the porous carbon material. Needless to mention, the porous carbon material may also contain one or more elements other than the above-described elements, and the above-described content ranges of the various elements may vary depending on the application of the porous carbon material.

In the present invention, the analysis of various elements can be performed by energy dispersion spectroscopy (EDS) while using, for example, an energy dispersive X-ray analyzer (for example, JED-2200F manufactured by JEOL Ltd. (trademark)). As measurement conditions, the scanning voltage and irradiation current can be set, for example, at 15 kV and 13 µA, respectively.

When used in electrochemical devices such as batteries like lithium ion secondary batteries and electric double layer capacitors, phosphorus (P) and sulfur (S) may preferably be contained in the porous carbon material from the viewpoint of improving characteristics such as capacity and cycling characteristics. When the porous carbon material according to the present invention is used as an anode active material in a lithium ion secondary battery, for example, the inclusion of phosphorus (P) in the porous carbon material can obtain a high lithium doping level. As a result, an improvement can be achieved in battery capacity. On the other hand, the inclusion of sulfur (S) in the porous carbon material according to the present invention can suppress the decomposition of an electrolyte solution, thereby making it possible to achieve improvements in cycling characteristics and high-temperature characteristics.

The porous carbon material according to the present invention can be used to selectively adsorb various unnecessary molecules in the body. Therefore, the porous carbon material according to the present invention can be used as orally-administrable adsorbent preparations or medical adsorbent preparations for medical internal medicines or the like useful for the treatment and prevention of diseases. When the porous carbon material according to the present invention is applied to the field of orally-administrable adsorbent preparations or medical adsorbent preparations, specific examples of the adsorbent according to the present invention can include an adsorbent for adsorbing creatinine, an adsorbent for adsorbing alizarin cyanine green, an adsorbent for adsorbing lysozyme, an adsorbent for adsorbing albumin, and an adsorbent for adsorbing an organic substance (for example, an organic molecule or protein) having a number average molecular weight of $1 \times 10^3$ to $1 \times 10^4$, all of which comprise the porous carbon material according to the present invention. Further, the porous carbon material according to the present invention can also be used as a packing material (adsorbent) for blood purification columns. In addition, the porous carbon material according to the present invention can also be applied as an adsorbent in various masks such as, for example, anti-pollinosis masks, and can adsorb, for example, proteins. Namely, the mask according to the present invention can be designed in a form provided with an adsorbent which comprises the porous carbon material according to the present invention. Furthermore, the porous carbon material according to the present invention can also be applied to adsorbing sheets. Namely, the adsorbing sheet according to the present invention can be designed in a form comprising a sheet-shaped member, which comprises the porous carbon material according to the present invention, and a support member supporting the sheet-shaped member thereon. Still furthermore, the porous carbon material according to the present invention can also be used as a water-purifying adsorbent for purifying water. It is to be noted that a chemical treatment or molecule modification may be applied to the surfaces of the porous carbon material according to the present invention. The chemical treatment can be, for example, a treatment that forms carboxyl groups on the surfaces by treatment with nitric acid. By conducting a similar treatment as the activation treatment with steam, oxygen, an alkali or the like, various functional groups such as hydroxyl groups, carboxyl groups, ketone groups or ester groups can be formed in the surfaces of the porous carbon material. Moreover, a molecule modification is also feasible by chemically reacting the porous carbon material with a chemical species or protein having one or more reactable hydroxyl groups, carboxyl groups, amino groups and/or the like.

The carrier according to the present invention for carrying a drug thereon can be formed from the porous carbon material according to the present invention. Described specifically, when the porous carbon material according to the present invention is assumed to amount to one hundred parts by weight, a complex capable of releasing the drug (a drug-carrier complex capable of adequately controlling the release rate of the drug) can be obtained by adsorbing and carrying one parts by weight to two hundred parts by weight of the drug on the porous carbon material according to the present invention. Such a drug-carrier complex (drug release preparation) comprises the porous carbon material according to the present invention and the drug, and can take such a form that as the weight ratio of the porous carbon material to the drug, the drug amounts to one parts by weight to two hundred parts by weight when the porous carbon material according to the present invention is assumed to amount to one hundred parts by weight.

As drugs which can be adsorbed and carried on the porous carbon material according to the present invention, organic molecules, polymer molecules and proteins can be mentioned. Specific examples can include, but are not limited to, pentoxifylline, prazosin, acyclovir, nifedipine, diltiazem, naproxen, ibuprofen, flurbiprofen, ketoprofen, fenoprofen, indomethacin, diclofenac, fentiazac, estradiol valerate, metoprolol, sulpiride, captopril, cimetidine, zidovudine, nicardipine, terfenadine, atenolol, salbutamol, carbamazepine, ranitidine, enalapril, simvastatin, fluoxetine, alprazolam, famotidine, ganciclovir, famciclovir, spironolactone, 5-asa, quinidine, perindopril, morphine, pentazocine, paracetamol, omeprazole, metoclopramide, aspirin, and metformin; and from the viewpoint of systemic and topical treatments, various hormones (for example, insulin, estradiol, and the like), asthma remedies (for example, albuterol), tuberculosis remedies (for example, rifampicin, ethambutol, streptomycin, isoniazid, pyrazinamide, and the like), cancer remedies (for example, cisplatin, carboplatin, Adriamycin, 5-FU, paclitaxel, and the like), and hypertension remedies (for example, clonidine, prazosin, propranolol, labetalol, bunitrolol, reserpine, nifedipine, furosemide, and the like). A porous carbon material-drug complex can be obtained by dissolving such a drug in an organic solvent which can dissolve the drug, immersing the porous carbon material according to the present invention in the resultant solution, and then eliminating the solvent and any extra solute. Specific solvents can include water, methyl alcohol, ethyl alcohol, isopropyl alcohol, butyl alcohol, acetone, ethyl acetate, chloroform, 2-chloromethane, 1-chloromethane, hexane, tetrahydrofuran, pyridine, and the like.

The porous carbon material according to the present invention has numerous pores. Contained as pores are "mesopores" the pore sizes of which range from 2 nm to 50 nm and "micropores" the pore sizes of which are smaller than 2 nm. Specifically, pores the pore sizes of which are, for example, 20 nm and smaller are contained numerously as mesopores, with pores the pore sizes of which are 10 nm and smaller being contained particularly numerously. As micropores, on the other hand, pores of 1.9 nm or so in pore size, pores of 1.5 nm or so in pore size and pores of from 0.8 nm to 1 nm or so in pore size are contained numerously. In the porous carbon material according to the present invention, the pore size as measured by BJH method and MP method is at least 0.1 cm$^3$/g, with at least 0.3 cm$^3$/g being still more preferred.

In the porous carbon material according to the present invention, it is desired that the value of specific surface area as measured by the nitrogen BET method (which may hereinafter be called simply "the value of specific surface area") may be preferably at least 50 m$^2$/g, more preferably at least 100 m$^2$/g to obtain still better functionality. When the porous carbon material according to the present invention is used in an electrochemical device such as a battery (non-aqueous electrolyte secondary battery) like a lithium ion secondary battery or an electric double layer capacitor, for example, the area of an electric double layer to be formed at an interface between the porous carbon material and an electrolyte solution upon charging or discharging becomes sufficiently large by controlling the value of its specific surface area to 10 m$^2$/g or greater, preferably 50 m$^2$/g or greater, more preferably 100 m$^2$/g or greater so that a large capacity can be obtained. When the value of its specific surface area is controlled to 1,500 m$^2$/g or smaller, on the other hand, an irreversible electrochemical reaction by functional groups existing on the surfaces of the porous carbon material can be suppressed, and as a result, the charge-discharge efficiency can be improved.

The term "the nitrogen BET method" means a method that measures an adsorption isotherm by adsorbing nitrogen as adsorbed molecules on an adsorbent (the porous carbon material in this context), desorbing it from the adsorbent, and analyzing measured data on the basis of a BET equation represented by the equation (1), and based on this method, a specific surface area, pore volume and the like can be calculated. Specifically, upon calculation of a value of specific surface area by the nitrogen BET method, an adsorption isotherm is first obtained by adsorbing nitrogen as adsorbed molecules on an adsorbent (the porous carbon material) and then desorbing it from the adsorbent. From the thus-obtained adsorption isotherm, $[p/\{V_a(P_0-P)\}]$ are calculated based on the equation (1) or an equation (1') derived by modifying the equation (1), and are plotted against the equilibrium relative pressure (p/p$_0$). Assuming these plots as a straight line, a slope s ($=[(C-1)/(C \cdot V_m)]$) and an intercept i ($=[1/(C \cdot V_m)]$) are then calculated based on the method of least squares. From the thus-determined slope s and intercept i, $V_m$ and C are calculated based on the equation (2-1) and the equation (2-2). Further, from $V_m$, a specific surface area aSBET is then calculated based on the equation (3) (see, pages 62 to 66 of the Analysis Software Manual for BELSORP-mini and BELSORP manufactured by BEL Japan Inc.). It is to be noted that this nitrogen BET method is a measurement method which follows JIS R 1626-1996 "Measurement method of the specific surface area of fine ceramic powder by the gas adsorption BET method."

$$V_a = (V_m \cdot C \cdot p)/[(P_0-P)\{1+(C-1)(P/P_0)\}] \tag{1}$$

$$[P/\{V_a(P_0-P)\}] = [(C-1)/(C \cdot V_m)](P/P_0) + [1/(C \cdot V_m)] \tag{1'}$$

$$V_m = 1/(s+i) \tag{2-1}$$

$$C = (s/i) + 1 \tag{2-2}$$

$$a_{sBET} = (V_m \cdot L \cdot \sigma)/22414 \tag{3}$$

where $V_a$: Adsorbed volume
$V_m$: Adsorbed volume in a monomolecular layer
p: Pressure of nitrogen at equilibrium
$P_0$: Saturation vapor pressure of nitrogen
L: Avogadro's number
σ: Absorption cross-sectional area of nitrogen When calculating a pore volume $V_p$ by the nitrogen BET method, an adsorbed volume V at a relative pressure preset as a relative pressure for the calculation of pore volume is determined, for example, by linearly interpolating the adsorption data of a determined adsorption isotherm. From this adsorbed volume V, the pore volume $V_p$ can be calculated based on the equation (4) (see pages 62-65 of the Analysis Software Manual for BELSORP-mini and BELSORP manufactured by BEL Japan, Inc.). It is to be noted that a pore volume based on the nitrogen BET method may hereinafter be called simply "a pore volume."

$$V_p = (V/22414) \times (M_g/\rho_g) \quad (4)$$

where
V: Adsorbed amount at a relative pressure
$M_g$: Molecular weight of nitrogen
$\rho_g$: Density of nitrogen The pore sizes of mesopores can be calculated, for example, as a distribution of pores from a rate of change in pore volume relative to the pore sizes on the basis of the BJH method. The BJH method is a method widely employed as a pore distribution analysis method. Upon conducting a pore distribution analysis on the basis of the BJH method, a desorption isotherm is first determined by causing adsorption and desorption of nitrogen as adsorptive molecules on an adsorbent (porous carbon material). Based on the thus-determined desorption isotherm, the thickness of an adsorbed layer upon stepwise desorption of adsorptive molecules (for example, nitrogen) from a state that a pore is filled with the adsorptive molecules and the inner diameter of a pore (two times of the radius of the core) formed upon desorption are determined. The pore radius $r_p$ is calculated based on the equation (5), and the pore volume is calculated based on the equation (6). A pore distribution curve can then be obtained from the pore radius and pore volume by plotting the rate of change in pore volume ($dV_p/dr_p$) against the pore size ($2r_p$) (see pages 85-88 of the Analysis Software Manual for BELSORP-mini and BELSORP manufactured by BEL Japan, Inc.)

$$r_p = t + r_k \quad (5)$$

$$V_{pn} = R_n \cdot dV_n - R_n \cdot dt_n \cdot c \cdot \Sigma A_{pj} \quad (6)$$

where $Rn = r_{pn}^2/(r_{kn} - 1 + dt_n)^2 \quad (7)$ where
$r_p$: Pore radius
$r_k$: Core radius (inner diameter/2) when an adsorption layer of t in thickness is adsorbed at the pressure on the inner wall of a pore having a pore radius $r_p$
$V_{pn}$: pore volume when the $n^{th}$ desorption of nitrogen has occurred
$dV_n$: Rate of a change upon occurrence of the desorption
$dt_n$: Rate of a change in the thickness $t_n$ of adsorption layer when the $n^{th}$ desorption of nitrogen has occurred
$r_{kn}$: core radius at the time of the $n^{th}$ desorption of nitrogen
c: fixed value
$r_{pn}$: Pore radius when the $n^{th}$ desorption of nitrogen has occurred.

Further, $\Sigma A_{pj}$ represents the integrated value of the areas of the walls of pores from j=1 to j=n-1.

The pore sizes of micropores can be calculated, for example, as a distribution of pores from a rate of change in pore volume relative to the pore sizes on the basis of the MP method. Upon conducting a pore distribution analysis on the basis of the MP method, an adsorption isotherm is first determined by causing adsorption of nitrogen on an adsorbent (porous carbon material). This adsorption isotherm is then converted into a pore volume against the thickness t of the adsorbed layer (plotted against t). Based on the curvature of the plots (the rates of changes in pore volume relative to the rates of changes in the thickness t of the adsorbed layer), a pore size distribution curve can then be obtained (see pages 72-73 and 82 of the Analysis Software Manual for BELSORP-mini and BELSORP manufactured by BEL Japan Inc.).

The porous carbon material precursor is treated with an acid or alkali. As a specific treatment method, a method that immerses the porous carbon material precursor in an aqueous solution of the acid or alkali or a method that reacts the porous carbon material precursor with the acid or alkali in a vapor phase can be mentioned. More specifically, when conducting the treatment with the acid, the acid can be, for example, a fluorine compound that shows acidity, such as hydrogen fluoride, hydrofluoric acid, ammonium fluoride, calcium fluoride or sodium fluoride. When such a fluorine compound is used, the fluorine element is needed to be in an amount 4 times as much as the silicon element in the silicon component contained in the porous carbon material precursor, and the concentration of an aqueous solution of the fluorine compound may preferably be 10 wt % or higher. When eliminating, with hydrofluoric acid, the silicon component (for example, silicon dioxide) contained in the porous carbon material precursor, silicon dioxide reacts with hydrofluoric acid as shown by the chemical equation (1) or chemical equation (2), and is eliminated as hexafluorosilicic acid ($H_2SiF_6$) or silicon tetrafluoride ($SiF_4$) so that a porous carbon material can be obtained. It is then necessary to conduct washing and drying.

$$SiO_2 + 6HF \rightarrow H_2SiF_6 + 2H_2O \quad (1)$$

$$SiO_2 + 4HF \rightarrow SiF_4 + 2H_2O \quad (2)$$

When conducting the treatment with the alkali (base), the alkali can be, for example, sodium hydroxide. When an aqueous solution of the alkali is used, the pH of the aqueous solution is needed to be 11 or higher. When eliminating, with an aqueous solution of sodium hydroxide, the silicon component (for example, silicon dioxide) contained in the porous carbon material precursor, heating of the aqueous solution of sodium hydroxide causes silicon dioxide to react as indicated by the chemical equation (3) so that silicon dioxide is eliminated as sodium silicate ($Na_2SiO_3$) to obtain a porous carbon material. When sodium hydroxide is reacted in a vapor phase to conduct the treatment, on the other hand, heating of solid sodium hydroxide induces a reaction as indicated by the chemical equation (3) so that silicon dioxide is eliminated as sodium silicate ($Na_2SiO_3$) to obtain a porous carbon material. It is then necessary to conduct washing and drying.

$$SiO_2 + 2NaOH \rightarrow Na_2SiO_3 + H_2O \quad (3)$$

BRIEF DESCRIPTION OF THE DRAWINGS

FIGS. (A) and (B) of FIG. 1 are graphs presenting pore distributions of mesopores and pore distributions of micropores in porous carbon materials of Example 1 and Comparative Example 1, respectively.

FIGS. (A) and (B) of FIG. 2 are graphs presenting pore distributions of mesopores and pore distributions of micropores in porous carbon materials of Example 2 and Comparative Example 2, respectively.

Figure 3:
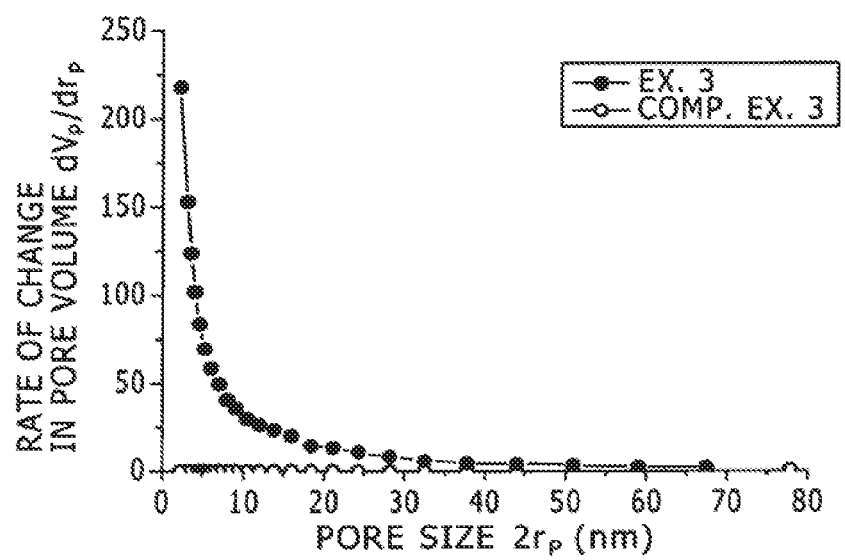
Figure 3:
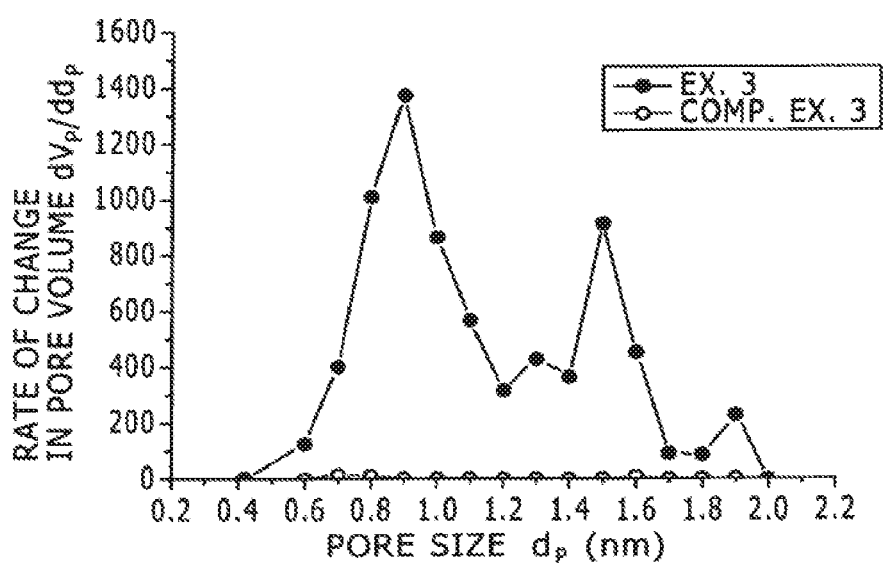

FIGS. (A) and (B) of FIG. 3 are graphs presenting pore distributions of mesopores and pore distributions of micropores in porous carbon materials of Example 3 and Comparative Example 3, respectively.

Figure 4:
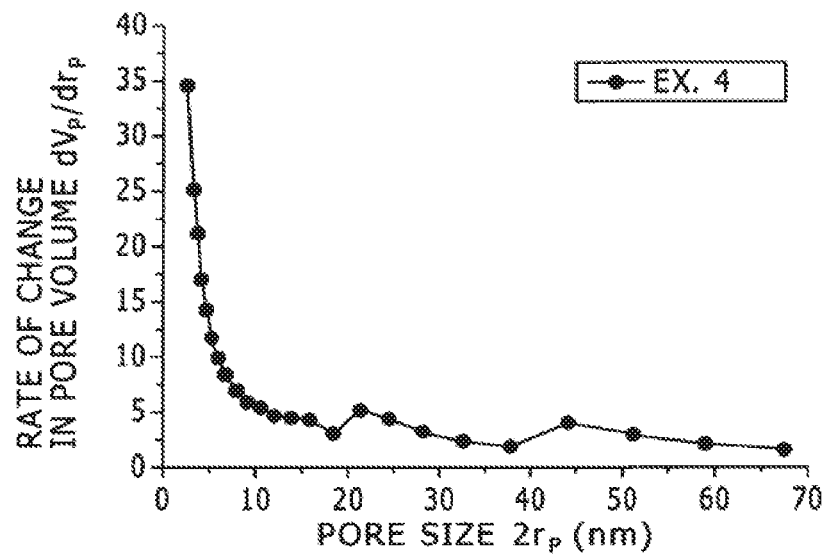
Figure 4:
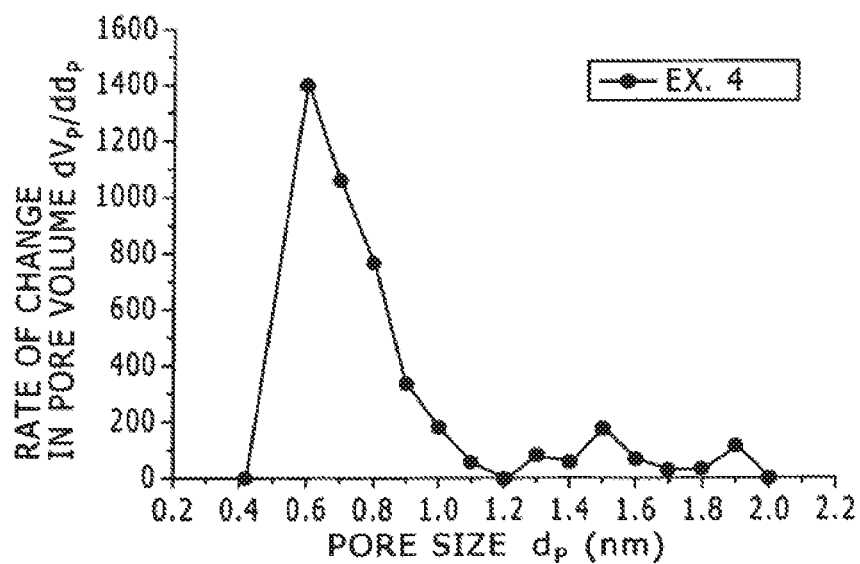

FIGS. (A) and (B) of FIG. 4 are graphs presenting a pore distribution of mesopores and a pore distribution of micropores in a porous carbon material of Example 4, respectively.

Figure 5:
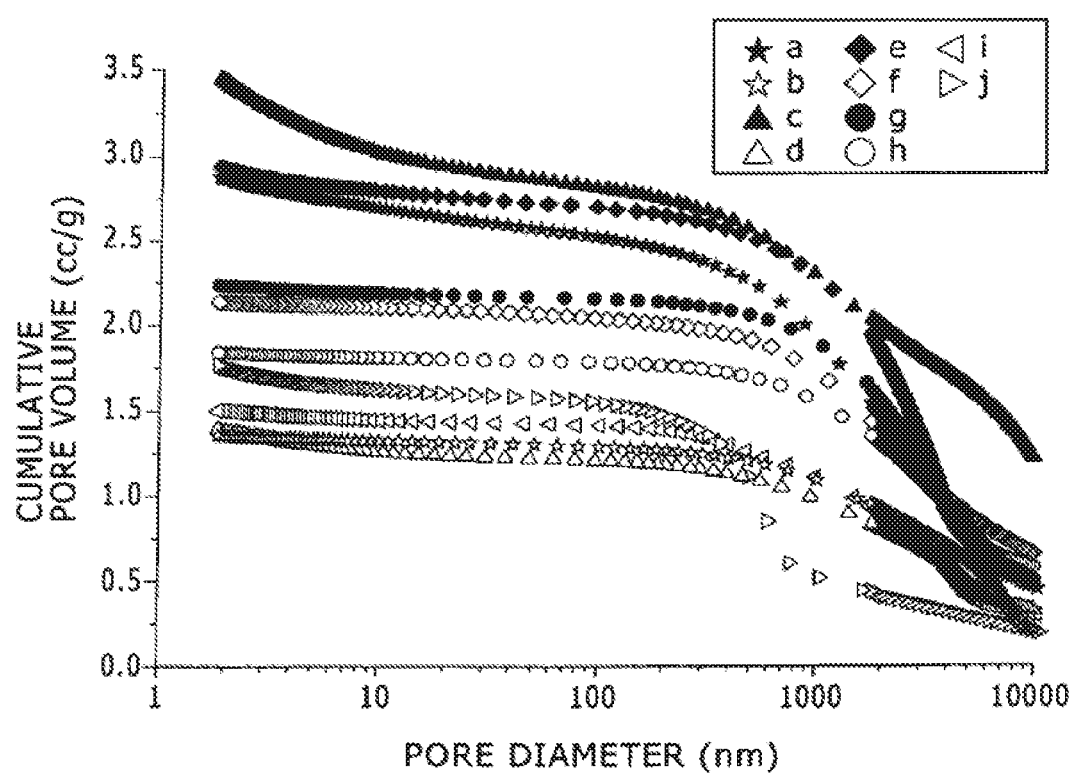

FIG. 5 is a graph showing the results obtained by measuring the pores in various porous carbon materials by the mercury penetration method.

Figure 6:
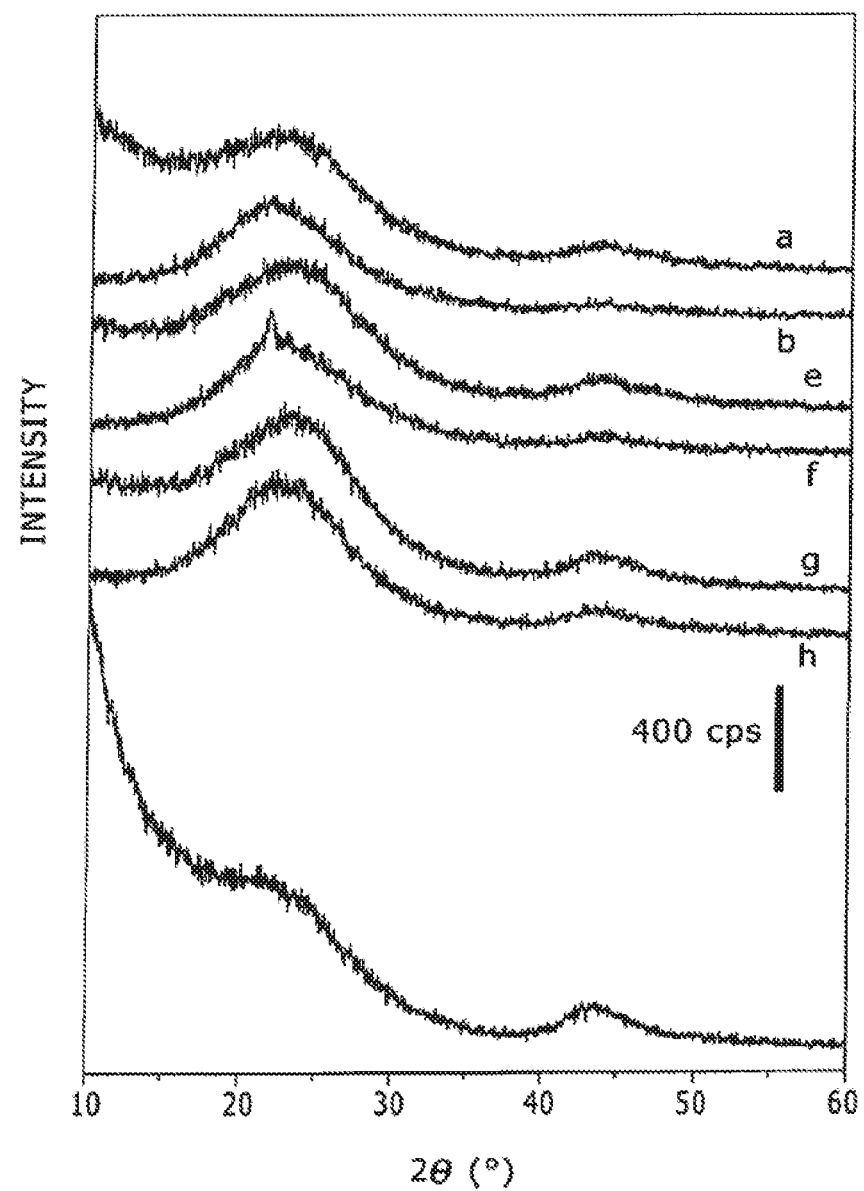

FIG. 6 is a graph showing the results of X-ray diffraction measurements of various porous carbon materials.

Figure 7:
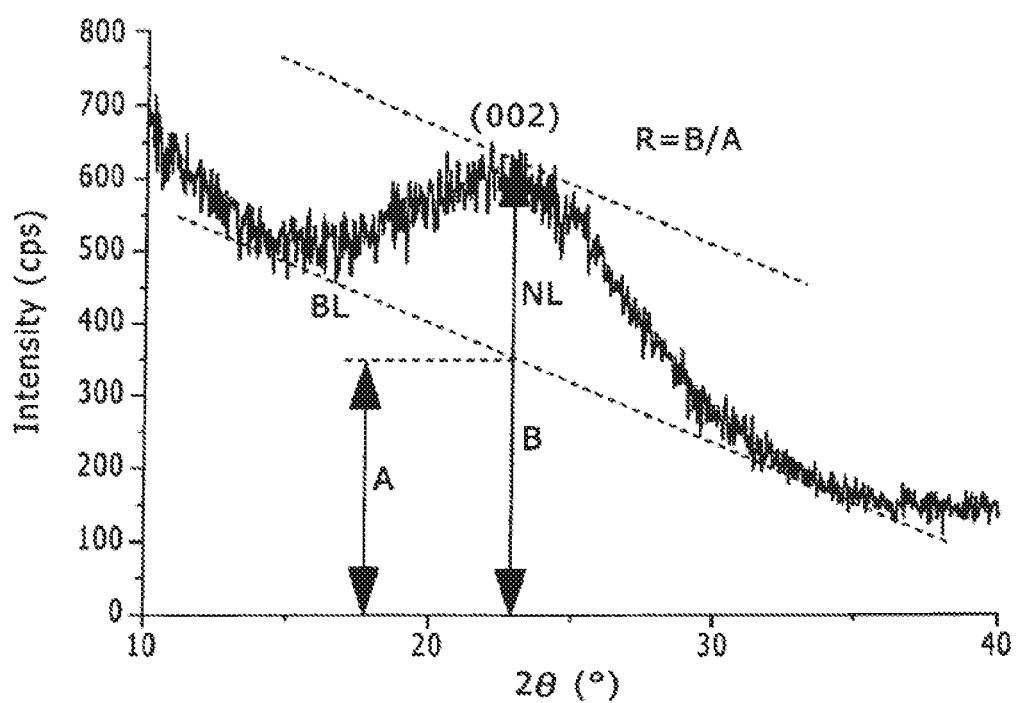

FIG. 7 is a graph for describing a method that determines an R value based on the results of an X-ray diffraction measurement.

Figure 8:
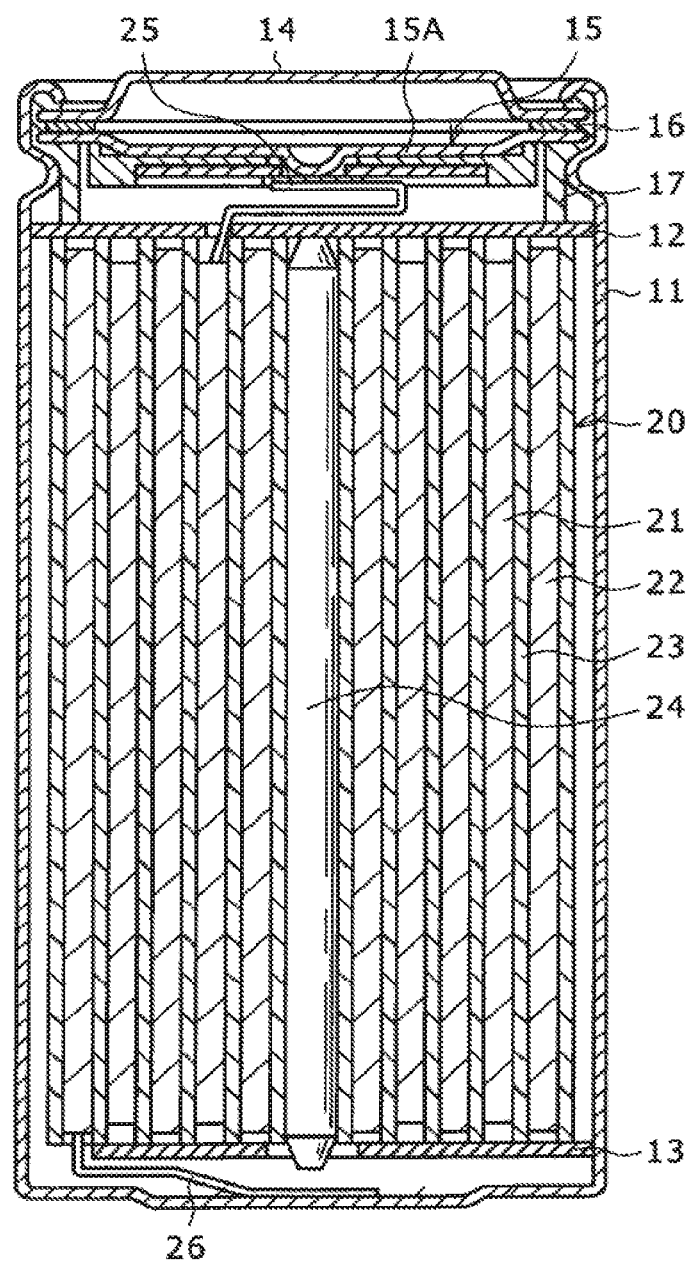

FIG. 8 is a schematic cross-sectional view of a lithium ion secondary battery making use of a porous carbon material according to the present invention.

Figure 9:
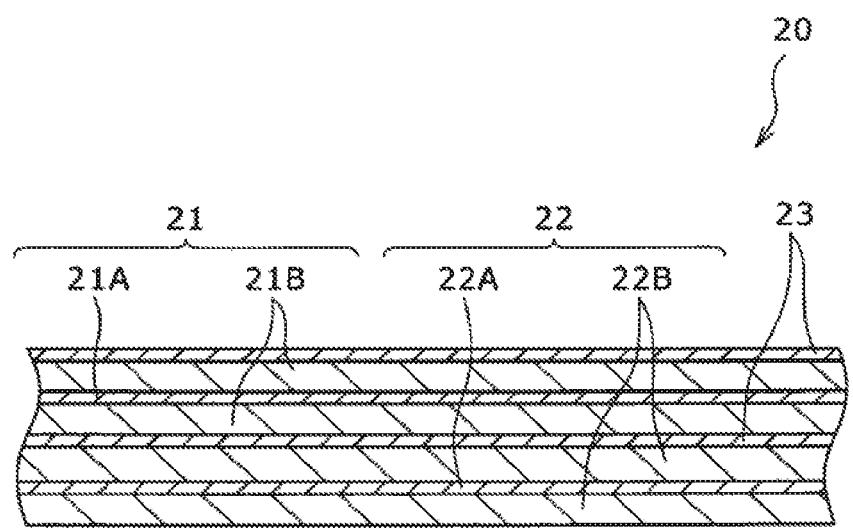

FIG. 9 is an enlarged view of a portion of a rolled electrode stack in the lithium ion secondary battery depicted in FIG. 8.

Figure 10:
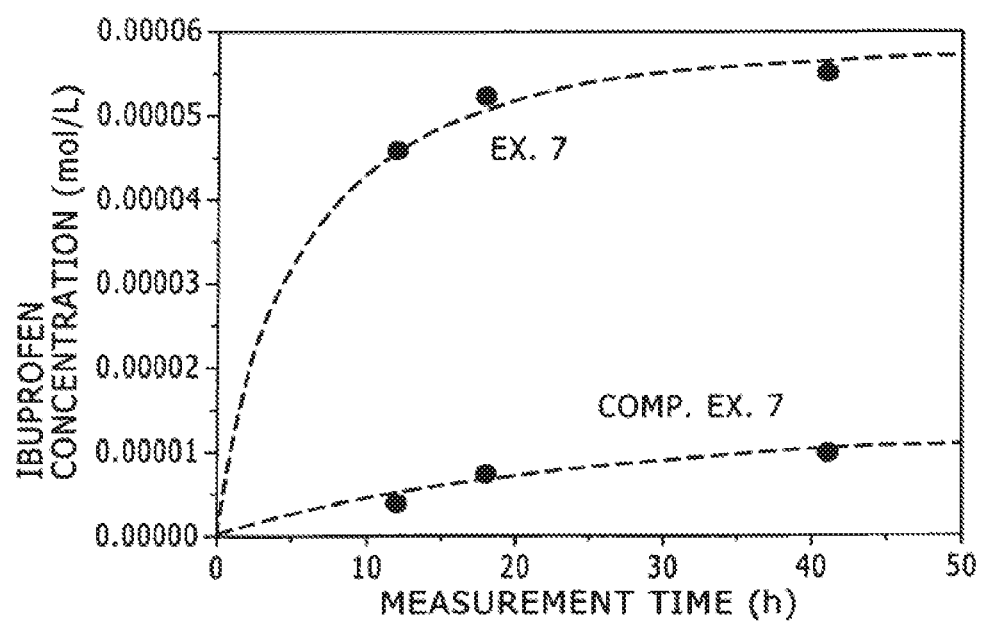

FIG. 10 is a graph showing measurement results of the concentration of ibuprofen at respective times in Example 7.

Figure 11:
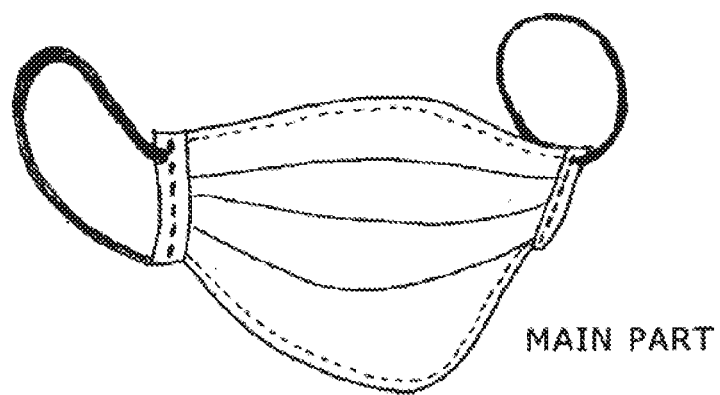
Figure 11:

FIGS. (A) and (B) of FIG. 11 are a schematic of an anti-pollinosis mask in Example 8 and a diagram illustrating a schematic cross-sectional structure of a main part of the anti-pollinosis mask, respectively.

DETAILED DESCRIPTION

With reference to the drawings, the present invention will hereinafter be described based on Examples.

Example 1

Example 1 relates to a porous carbon material according to the present invention. In Example 1, rice (rice plant) husk was used as a plant-derived material which is a raw material for a porous carbon material. The porous carbon material of Example 1 was obtained by carbonizing the rice husk as a raw material into a carbonaceous material (porous carbon material precursor) and then applying an acid treatment.

In the production of the porous carbon material of Example 1, a heating treatment (precarbonizing treatment) was first applied to the rice husk (grown in Kagoshima Prefecture, husk of the Isehikari variety), which had been ground, in an inert gas. Specifically, the rice husk was heated and charred at 500° C. for 5 hours in a nitrogen gas stream to obtain a charred material. It is to be noted that by conducting such a treatment, tar components which would be formed in the subsequent carbonization can be decreased or eliminated. Subsequently, the charred material (10 g) was placed in an alumina-made crucible, and was heated to 1,000° C. at a ramp-up rate of 5° C./min in a nitrogen gas stream (10 L/min). The charred material was then carbonized at 1,000° C. for 5 hours into a carbonaceous material (porous carbon material precursor), which was thereafter allowed to cool down to room temperature. It is to be noted that during the carbonization and cooling, nitrogen gas was caused to flow continuously. The porous carbon material precursor was then immersed overnight in a 46 vol % aqueous solution of hydrofluoric acid to conduct its acid treatment, followed by washing with water and ethyl alcohol until pH 7 was reached. By finally conducting drying, it was possible to obtain the porous carbon material of Example 1.

Using the same raw material as in Example 1, a porous carbon material was obtained as Comparative Example 1 based on a similar procedure as in Example 1 except that the acid treatment was not conducted.

Figure 1:
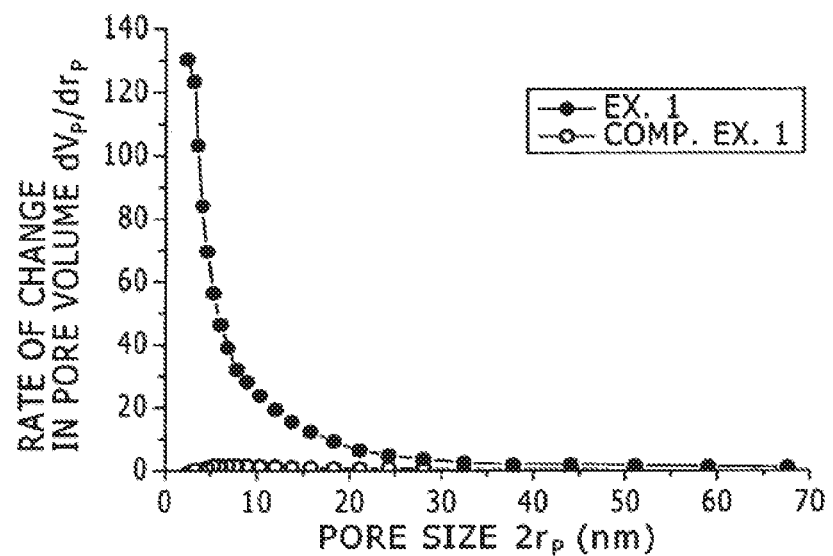
Figure 1:
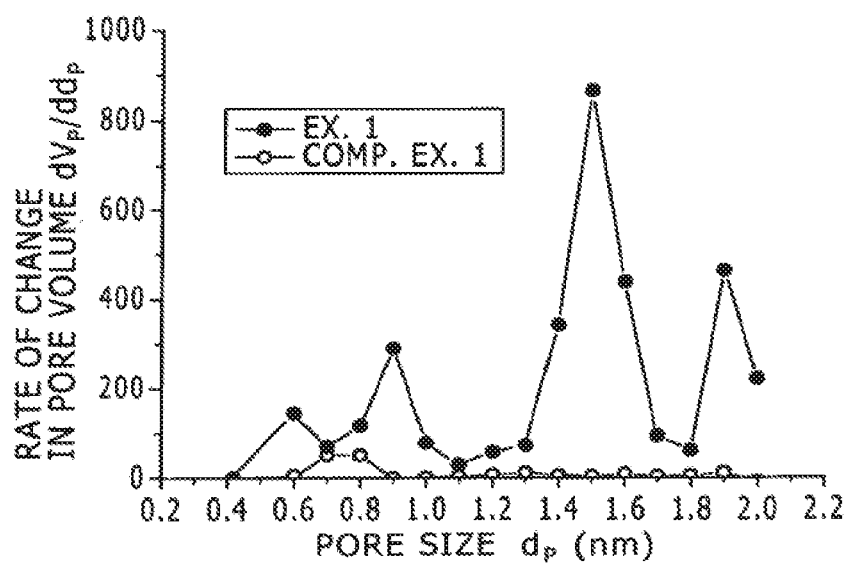

With respect to the porous carbon materials of Example 1 and Comparative Example 1, their specific surface areas and pore volumes were measured. The results shown in Table 1 were obtained. With respect to the porous carbon materials of Example 1 and Comparative Example 1, the pore size distributions of their mesopores and micropores were measured. The results shown in FIGS. (A) and (B) of FIG. 1 were obtained.

Nitrogen adsorption and desorption tests were conducted using BELSORP-mini (manufactured by BEL Japan Inc.) as a measuring instrument for the determination of the specific surface areas and pore volumes. As a measuring condition, the measurement equilibrium relative pressure ($p/p_0$) was set at 0.01 to 0.95. Based on the BELSORP Analysis Software, the specific surface areas and pore volumes were calculated. Further, nitrogen adsorption and desorption tests were conducted using the above-mentioned measuring instrument, and the pore size distributions of the mesopores and micropores were calculated by the BELSORP Analysis Software on the basis of the BJH method and MP method. It is to be noted that in Examples, Comparative Examples and Referential Examples to be described subsequently herein, the measurements of specific surfaces areas and pore volumes and pore size distributions of mesopores and micropores were conducted by similar methods.

As shown in Table 1, the specific surface area and pore volume of the porous carbon material of Example 1 in which the acid treatment was conducted were considerably large compared with the specific surface area and pore volume of the porous carbon material of Comparative Example 1 in which no acid treatment was conducted, and the value of specific surface area was 400 $m^2/g$ or greater and the value of pore volume was 0.1 $cm^3/g$ or greater. It was also found that as shown in FIG. (A) of FIG. 1, the porous carbon material of Example 1 contained many mesopores of 20 nm and smaller in pore size, especially many mesopores of 10 nm and smaller in pore size compared with the porous carbon material of Comparative Example 1. It was also found that as shown in FIG. (B) of FIG. 1, the porous carbon material of Example 1 contained many micropores of approx. 1.9 nm in pore size, many micropores of approx. 1.5 nm in pore size and many micropores of approx. 0.8 nm to 1 nm in pore size compared with the porous carbon material of Comparative Example 1.

The porous carbon materials of Example 1 and Comparative Example 1 were also subjected to an elemental analysis, and the results shown in Table 2 were obtained. It is to be noted that using an energy dispersive X-ray analyzer (JED-2200F manufactured by JEOL Ltd. (trademark)) as a measuring instrument for elemental analysis, each element was quantitated by energy dispersion spectroscopy (EDS) and its content was then calculated in terms of percentage by weight (wt %). As measurement conditions, the scanning voltage and irradiation current were set at 15 kV and 13 µA, respectively. They were set likewise in the subsequent Examples and Comparative Examples.

As shown in Table 2, the porous carbon material of Example 1 in which the acid treatment was conducted was lower in the contents of silicon (Si), oxygen (0), potassium (K), calcium (Ca) and sodium (Na) than the porous carbon material of Comparative Example 1 in which no acid treatment was conducted. In particular, the contents of silicon (Si) and oxygen (0) substantially decreased in Example 1 than in Comparative Example 1, and became 1 wt % or lower. On the other hand, the contents of phosphorus (P) and sulfur (S) increased more in Example 1 than in Comparative Example 1. From the foregoing, it has been confirmed that in a porous carbon material produced by carbonizing rice husk as a raw material at 800° C. to 1,400° C. and then conducting a treatment with an acid, the content of silicon (Si) becomes 1 wt % or lower, the content of magnesium (Mg) becomes at least 0.01 wt % but at most 3 wt %, the content of potassium (K) becomes at least 0.01 wt % but at most 3 wt %, and the content of calcium (Ca) becomes at least 0.05 wt % but at most 3 wt %. It has also been confirmed that the content of phosphorus (P) becomes at least 0.01 wt % but at most 3 wt % and the content of sulfur (S) becomes at least 0.01 wt % but at most 3 wt %. It is to be noted that as other elements, although the types of elements are not shown, carbon (C) was most abundant and carbon (C) amounted to 90% or more of the other elements. Here, silicon is contained as an amorphous silica component in rice husk, and the content of silicon in the rice husk as the raw material was 9.4 wt %.

As the porous carbon material of Example 1 substantially decreased in the contents of silicon (Si) and oxygen (O) than the porous carbon material of Comparative Example 1, it was also suggested from the analysis results of Example 1 that silicon dioxide was abundantly contained in the carbonaceous material (porous carbon material precursor). It is, accordingly, suggested that the treatment of a porous carbon material precursor with an acid eliminates contained silicon components such as silicon dioxide and contributes to an increase in the value of specific surface area. Further, it has been confirmed that by the treatment with an acid, mesopores and micropores increase. Similar suggestions and confirmation were derived from the Examples to be described subsequently herein. Similar results were also obtained with a porous carbon material obtained by conducting a treatment with an alkali (base) such as an aqueous solution of sodium hydroxide as an alternative to aqueous solution of hydrofluoric acid.

Example 2

Example 2 is a modification of Example 1. In Example 2, straw of rice plant (grown in Kagoshima Prefecture; the Isehikari variety) was used as a plant-derived material which was a raw material for a porous carbon material. The porous carbon material of Example 2 was obtained by carbonizing the straw as a raw material into a carbonaceous material (porous carbon material precursor) and then applying an acid treatment. It is to be noted that a similar process as in Example 1 was employed for the production of the porous carbon material. Using the same raw material as in Example 2, a porous carbon material was obtained as Comparative Example 2 based on a similar procedure as in Example 1 except that the acid treatment was not conducted.

Figure 2:
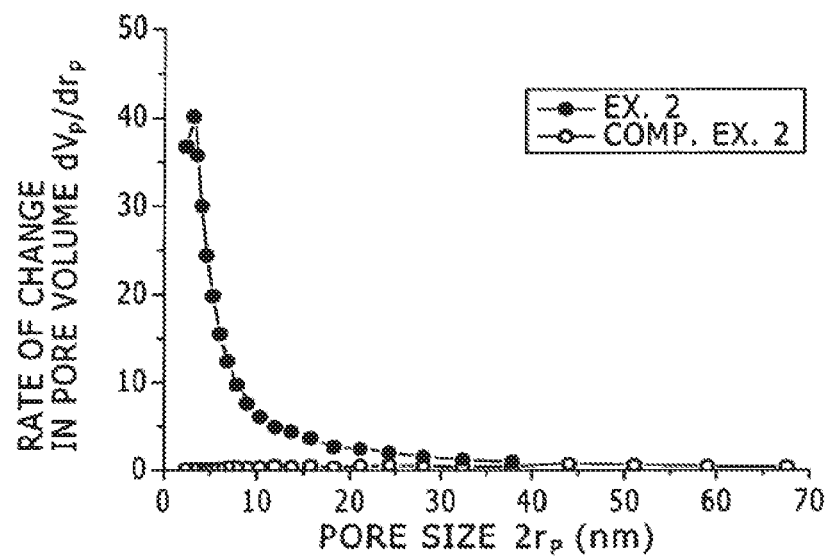
Figure 2:
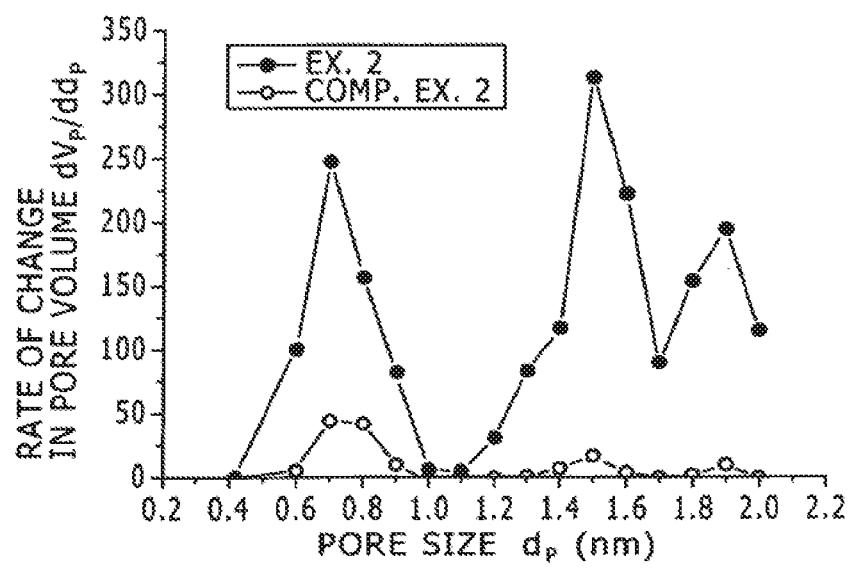

With respect to the porous carbon materials of Example 2 and Comparative Example 2, their specific surface areas and pore volumes were measured. The results shown in Table 1 were obtained. The pore size distributions of their mesopores and micropores were also measured. The results shown in FIGS. (A) and (B) of FIG. 2 were obtained.

As shown in Table 1, it was found that the specific surface area and pore volume of the porous carbon material of Example 2 in which the acid treatment was conducted were considerably large compared with the specific surface area and pore volume of the porous carbon material of Comparative Example 2 in which no acid treatment was conducted and that the value of specific surface area was 100 m²/g or greater and the value of pore volume was 0.1 cm³/g or greater. It was also found that as shown in FIG. (A of FIG. 2, the porous carbon material of Example 2 contained many mesopores of 20 nm and smaller in pore size, especially many mesopores of 10 nm and smaller in pore size compared with the porous carbon material of Comparative Example 2. It was also found that as shown in FIG. (B) of FIG. 2, the porous carbon material of Example 2 contained many micropores of approx. 1.9 nm in pore size, many micropores of approx. 1.5 nm in pore size and many micropores of approx. 0.8 nm to 1 nm in pore size compared with the porous carbon material of Comparative Example 2.

The porous carbon materials of Example 2 and Comparative Example 2 were also subjected to an elemental analysis, and the results shown in Table 2 were obtained.

As shown in Table 2, the porous carbon material of Example 2 in which the acid treatment was conducted was lower in the contents of silicon (Si), oxygen (O), magnesium (Mg), potassium (K) and sodium (Na) than the porous carbon material of Comparative Example 2 in which no acid treatment was conducted. In particular, the contents of silicon (Si) and oxygen (O) substantially decreased in Example 2 than in Comparative Example 2, and became 1 wt % or lower. On the other hand, the contents of phosphorus (P), sulfur (S) and calcium (Ca) increased more in Example 2 than in Comparative Example 2. From the foregoing, it has been confirmed that in a porous carbon material produced by carbonizing straw as a raw material at 800° C. to 1,400° C. and then conducting a treatment with an acid, the content of silicon (Si) also becomes 1 wt % or lower, the content of magnesium (Mg) also becomes at least 0.01 wt % but at most 3 wt %, the content of potassium (K) also becomes at least 0.01 wt % but at most 3 wt %, and the content of calcium (Ca) also becomes at least 0.05 wt % but at most 3 wt %. It has also been confirmed that the content of phosphorus (P) becomes at least 0.01 wt % but at most 3 wt % and the content of sulfur (S) becomes at least 0.01 wt % but at most 3 wt %. It is to be noted that as other elements, although the types of elements are not shown, carbon (C) was most abundant and carbon (C) amounted to 90% or more of the other elements. Here, silicon is contained as an amorphous silica component in straw, and the content of silicon in the straw as the raw material was 6.8 wt %.

Example 3

Example 3 is also a modification of Example 1. In Example 3, grass reed (cut in December, 2006 in Aoba Ward, Yokohama City; withered in winter) was used as a plant-derived material which was a raw material for a porous carbon material. The porous carbon material of Example 3 was obtained by carbonizing the grass reed as a raw material into a carbonaceous material (porous carbon material precursor) and then applying an acid treatment. It is to be noted that a similar process as in Example 1 was employed for the production of the porous carbon material. Using the same raw material as in Example 3, a porous carbon material was obtained as Comparative Example 3 based on a similar procedure as in Example 1 except that the acid treatment was not conducted.

With respect to the porous carbon materials of Example 3 and Comparative Example 3, their specific surface areas and pore volumes were measured. The results shown in Table 1 were obtained. The pore size distributions of their mesopores and micropores were also measured. The results shown in FIGS. (A) and (B) of FIG. 3 were obtained.

As shown in Table 1, it was found that the specific surface area and pore volume of the porous carbon material of Example 3 in which the acid treatment was conducted were considerably large compared with the specific surface area and pore volume of the porous carbon material of Comparative Example 3 in which no acid treatment was conducted and that the value of specific surface area was 100 m²/g or greater and the value of pore volume was 0.1 cm³/g or greater. It was also found that as shown in FIG. (A) of FIG.

3, the porous carbon material of Example 3 contained many mesopores of 20 nm and smaller in pore size, especially many mesopores of 10 nm and smaller in pore size compared with the porous carbon material of Comparative Example 3. It was also found that as shown in FIG. (B) of FIG. 3, the porous carbon material of Example 3 contained many micropores of approx. 1.9 nm in pore size, many micropores of approx. 1.5 nm in pore size, many micropores of approx. 1.3 nm in pore size and many micropores of approx. 0.8 nm to 1 nm in pore size compared with the porous carbon material of Comparative Example 3.

The porous carbon materials of Example 3 and Comparative Example 3 were also subjected to an elemental analysis, and the results shown in Table 2 were obtained.

As shown in Table 2, the porous carbon material of Example 3 in which the acid treatment was conducted was lower in the contents of silicon (Si) and oxygen (0) than the porous carbon material of Comparative Example 3 in which no acid treatment was conducted. In particular, the contents of silicon (Si) and oxygen (0) substantially decreased in Example 3 than in Comparative Example 3, and became 1 wt % or lower. On the other hand, the contents of phosphorus (P), sulfur (S), potassium (K) and calcium (Ca) increased more in Example 3 than in Comparative Example 3. From the foregoing, it has been confirmed that in a porous carbon material produced by carbonizing reed as a raw material at 800° C. to 1,400° C. and then conducting a treatment with an acid, the content of silicon (Si) also becomes 1 wt % or lower, the content of magnesium (Mg) also becomes 0.01 wt % or higher but 3 wt % or lower, the content of potassium (K) also becomes at least 0.01 wt % but at most 3 wt %, and the content of calcium (Ca) also becomes at least 0.05 wt % but at most 3 wt %. It has also been confirmed that the content of phosphorus (P) becomes at least 0.01 wt % but at most 3 wt % and the content of sulfur (S) becomes at least 0.01 wt % but at most 3 wt %. It is to be noted that as other elements, although the types of elements are not shown, carbon (C) was most abundant and carbon (C) amounted to 90% or more of the other elements. Here, silicon is contained as an amorphous silica component in reed, and the content of silicon in the reed as the raw material was 4.8 wt %.

Example 4

Example 4 is also a modification of Example 1. In Example 4, seaweed stem (grown in the Sanriku district of Iwate Prefecture) was used as a plant-derived material which was a raw material for a porous carbon material. The porous carbon material of Example 4 was obtained by carbonizing the seaweed stem as a raw material into a carbonaceous material (porous carbon material precursor) and then applying an acid treatment.

Specifically, the seaweed stem was first heated, for example, at a temperature of 500° C. or so to char the same. It is to be noted that before the heating, the seaweed stem as a raw material may be treated with an alcohol, for example. As a specific treatment method, the method that immerses the seaweed stem in ethyl alcohol or the like can be mentioned. By this treatment, the water contained in the raw material can be decreased, and at the same time, non-carbon elements and mineral components which would be contained in a porous carbon material to be obtained finally can be dissolved out. By this alcohol treatment, it is also possible to reduce the occurrence of gas during carbonization. More specifically, the seaweed stem was immersed for 48 hours in ethyl alcohol. It is to be noted that ultrasonication was applied in ethyl alcohol. Next, the seaweed stem was heated and charred at 500° C. for 5 hours in a nitrogen gas stream to obtain a charred material. It is to be noted that by conducting such a treatment (precarbonization treatment), tar components which would be formed in the subsequent carbonization can be decreased or eliminated. Subsequently, the charred material (10 g) was placed in an alumina-made crucible, and was heated to 1,000° C. at a ramp-up rate of 5° C./min in a nitrogen gas stream (10 L/min). The charred material was then carbonized at 1,000° C. for 5 hours into a carbonaceous material (porous carbon material precursor), which was thereafter allowed to cool down to room temperature. It is to be noted that during the carbonization and cooling, nitrogen gas was caused to flow continuously. The porous carbon material precursor was then immersed overnight in a 46 volt aqueous solution of hydrofluoric acid to conduct its acid treatment, followed by washing with water and ethyl alcohol until pH 7 was reached. By finally conducting drying, it was possible to obtain the porous carbon material of Example 4.

With respect to the porous carbon material of Example 4, its specific surface area and pore volume were measured. The results shown in Table 1 were obtained. The pore size distributions of its mesopores and micropores were also measured. The results shown in FIGS. (A) and (B) of FIG. 4 were obtained.

As shown in Table 1, it was found that the values of specific surface area and pore volume of the porous carbon material of Example 4 became 400 m$^2$/g or greater and 0.1 cm$^3$/g or greater, respectively. It was found that as shown in FIG. (A) of FIG. 4, the porous carbon material of Example 4 contained many mesopores of 20 nm to 25 nm in pore size and many mesopores of 15 nm and smaller in pore size. It was also found that as shown in FIG. (B) of FIG. 4, the porous carbon material of Example 4 contained many micropores of approx. 1.8 nm to 2.0 nm in pore size, many micropores of approx. 1.4 nm to 1.6 nm in pore size, and many micropores of approx. 0.5 nm to 1 nm in pore size. An elemental analysis was also conducted on the porous carbon material of Example 4, and the results shown in Table 2 were obtained.

As has been described above, it has been confirmed from the results of Table 1 and Table 2 that by conducting carbonization at 800° C. to 1,400° C. and then a treatment with an acid, the resulting porous carbon material, irrespective of the kind of a plant as a raw material, has a value of specific surface area of 10 m$^2$/g or greater as measured by the nitrogen BET method and a silicon (Si) content of 1 wt % or lower.

TABLE 1

| Example | Comp. Ex. | Specific surface area (m$^2$/g) | Pore volume (cm$^3$/g) |
|---|---|---|---|
| 1 | | 429 | 0.47 |
| | 1 | 6.26 | 0.018 |
| 2 | | 130 | 0.14 |
| | 2 | 2.46 | 0.014 |
| 3 | | 141.9 | 0.12 |
| | 3 | 1.57 | 0.0046 |
| 4 | | 492 | 0.34 |

TABLE 2

| Ex. | Comp. Ex. | O | Na | Mg | Si | P | S | K | Ca | Others |
|---|---|---|---|---|---|---|---|---|---|---|
| 1 | | <0.01 | <0.01 | 0.09 | 0.91 | 0.23 | 0.07 | 0.18 | 0.15 | 98.37 |
| | 1 | 22.77 | 0.05 | 0.08 | 19.10 | 0.15 | 0.02 | 0.59 | 0.20 | 57.16 |
| 2 | | <0.01 | <0.01 | 0.17 | 0.97 | 0.39 | 0.20 | 0.71 | 0.55 | 97.01 |
| | 2 | 15.20 | 0.17 | 0.24 | 13.84 | 0.17 | 0.13 | 1.77 | 0.42 | 68.06 |
| 3 | | <0.01 | <0.01 | 0.10 | 0.71 | 0.41 | 0.17 | 0.82 | 0.42 | 97.37 |
| | 3 | 8.73 | <0.01 | 0.02 | 9.71 | 0.13 | 0.11 | 0.68 | 0.1 | 80.88 |
| 4 | | <0.01 | <0.01 | 1.99 | <0.01 | 0.48 | 2.70 | <0.01 | 6.74 | |

| Ex. | V | Cu | Z | Se | Others |
|---|---|---|---|---|---|
| 4 | <0.01 | 0.21 | 0.24 | <0.01 | 87.91 |

For reference, pores in various porous carbon materials were measured by the mercury penetration method. Specifically, using a mercury porosimeter (PASCAL440; manufactured by Thermo Electric Corporation), measurements were conducted by the mercury penetration method. The measurement range of pores was set at 10 μm to 2 nm. The results are shown in FIG. 5. The samples of the various porous carbon materials are as shown below in Table 3. It was confirmed that the pore volumes of the porous carbon materials according to the present invention as determined by the mercury penetration method were significantly increased by the application of an acid treatment with an aqueous solution of hydrofluoric acid (expressed as "hydrofluoric acid treatment" in the table). In addition, it was found that the pore volumes were greater than those of commercially-available activated carbons (which are Referential Example 6-1 and Referential Example 6-2 and will be described in detail in Example 6) and reached 2.2 cm$^3$/g or more.

TABLE 3

| Sample | Treatment | Raw material | Pore volume (cm$^3$/g) |
|---|---|---|---|
| a | Carbonized at 800° C.; hydrofluoric acid treatment applied | Rice husk | 2.88 |
| b | Carbonized at 800° C.; hydrofluoric acid treatment not applied | | 1.36 |
| c | Carbonized at 1,000° C.; hydrofluoric acid treatment applied | Rice husk | 3.45 |
| d | Carbonized at 1,000° C.; hydrofluoric acid treatment not applied | | 1.39 |
| e | Carbonized at 1,000° C.; hydrofluoric acid treatment applied | Straw | 2.94 |
| f | Carbonized at 1,000° C.; hydrofluoric acid treatment not applied | | 2.14 |
| g | Carbonized at 1,000° C.; hydrofluoric acid treatment applied | Reed | 2.24 |
| h | Carbonized at 1,000° C.; hydrofluoric acid treatment applied | | 1.84 |
| i | Referential Example 6-1 | | 1.50 |
| j | Referential Example 6-2 | | 1.77 |

Further, the results of evaluations of the various porous carbon materials by powder X-ray diffractometry are shown in FIG. 6. Here, an X-ray diffractometer (RINT-TTRII) manufactured by RIGAKU Corporation was used, and Cu-Kα radiation was employed as an X-ray source. It is to be noted that the wavelength was 0.15405 nm. In addition, the applied voltage was set at 50 kilovolts, and the scanning step was set at 0.04°. As a result of the analysis by powder X-ray diffractometry, the porous carbon materials according to the present invention (the sample a, sample b, sample e, sample f, sample g, and sample h shown in Table 3) were confirmed to be higher in crystallinity than the commercially-available activated carbon (Referential Example 6-2) from the intensities of diffraction peaks around 25° diffraction angle 2□ [diffraction peaks of (002) planes].

With reference to a technical paper, Weibing Xing, J. S. Xue, Tao Zheng, A. Gibaud and J. R. Dahn, J. Electrochem. Soc. Vol. 143, 3482 (1996), the calculation of an R value which is an empirical parameter correlating to the number of graphene sheets was conducted. Specifically, as illustrated in FIG. 7, the R value (=B/A) was determined by conducting fitting, and the R value was considered to correlate to the number of graphene sheets in a porous carbon material. Namely, the greater the R value, was considered the higher (better) the crystallinity of the porous carbon material. It is to be noted that FIG. 7 diagrammatically illustrates a method that determines an R value by using the results of powder X-ray diffraction (XRD) of the sample a shown in Table 3. More specifically, when the intensity (count) at an intersection between the baseline BL of a diffraction peak of the (002) plane as obtained based on powdery X-ray diffractometry of the porous carbon material and a perpendicular line NL downwardly drawn from the diffraction peak of the (002) plane is assumed to be an "A value" and the intensity (count) of the diffraction peak of the (002) plane is assumed to be a "B value", the R value can be expressed as R=B/A. From Table 4, it has been found that in a porous carbon material according to the present invention, the R value is, for example, 1.5 or greater, more specifically, 1.8 or greater.

TABLE 4

| Treatment | Raw material | A value | B value | R value |
|---|---|---|---|---|
| Carbonized at 800° C.; hydrofluoric acid treatment applied | Rice husk | 6.5 | 11.6 | 1.78 |
| Carbonized at 1,200° C.; hydrofluoric acid treatment applied | Rice husk | 6.2 | 12.8 | 2.06 |
| Carbonized at 1,000° C.; hydrofluoric acid treatment applied | Straw | 5.3 | 13.0 | 2.45 |
| Carbonized at 1,000° C.; hydrofluoric acid treatment applied | Reed | 5.2 | 12.7 | 2.44 |
| Referential Example 6-2 | | 4.3 | 5.5 | 1.28 |

Example 5

In Example 5 to Example 8, a description will next be made about application examples of the porous carbon materials described in Example 1 to Example 4. In Example 5, lithium ion secondary batteries were fabricated as electrochemical devices. Anode active material layers were formed with the porous carbon materials described in Example 1 to Example 4, respectively. A schematic cross-sectional view of each lithium ion secondary battery is depicted in FIG. 8, and an enlarged view of a portion of a rolled electrode stack depicted in FIG. 8 is illustrated in FIG. 9.

In the lithium ion secondary battery, the capacity of an anode is expressed by a capacity component based on occlusion and release of lithium as an electrode reactant, and the lithium ion secondary battery has a battery structure called the so-called cylindrical type. Specifically, in the lithium ion secondary battery, a rolled electrode stack 20 with a cathode 21 and an anode 22 rolled with a separator 23 interposed therebetween and a pair of insulating plates 12, 13 are accommodated inside a substantially hollow cylindrical battery can 11. The battery can 11 is made, for example, of iron to which nickel plating has been applied, is closed at an end portion thereof, and is open at an opposite end portion thereof to form an open end portion. The paired insulating plates 12, 13 are arranged such that they hold the rolled electrode stack 20 therebetween and are located at right angles to a rolled peripheral wall thereof.

In the open end portion of the battery can 11, a battery cover 14, and a safety valve mechanism 15 and a positive temperature coefficient (PTC) device 16, which are arranged inside the battery cover 14, are assembled by staking them together via a gasket 17, so that the interior of the battery can 11 is sealed. The battery cover 14 is made of a similar material as the battery can 11, for example. The safety valve mechanism 15 is electrically connected to the battery cover 14 by way of the positive temperature coefficient device 16. The safety valve mechanism 15 is constructed such that, if the internal pressure rises to a predetermined level or higher due to internal short-circuiting, heating from the outside, or the like, a disk plate 15A is bulged out to cut off the electrical connection between the battery cover 14 and the rolled electrode stack 20. Responsive to a rise in temperature, the positive temperature coefficient device 16 increases in resistance to limit a current, thereby preventing abnormal heat evolution which would otherwise take place due to a large current. The gasket 17 is made, for example, of an insulating material, and is coated at its surfaces with asphalt.

For example, a center pin 24 is centrally inserted in the rolled electrode stack 20. In this rolled electrode stack 20, a cathode lead 25 made of aluminum or the like is connected to the cathode 21, while an anode lead 26 made of nickel or the like is connected to the anode 22. The cathode lead 25 is welded to the safety valve mechanism 15, and therefore, is electrically connected to the battery cover 14. On the other hand, the anode lead 26 is welded to the battery can 11.

In the cathode 21, cathode active material layers 21B are arranged, for example, on both sides of a cathode current collector 21A having the opposite sides in pair. It is to be noted that a cathode active material layer 21B may be arranged on only one side of the cathode current collector 21A. The cathode current collector 21A is made of a metal material such as, for example, aluminum, nickel or stainless steel. For example, the cathode active material layers 21B contain, as a cathode active material, any one, two or more of cathode materials capable of occluding and releasing lithium as the electrode reactant. The cathode active material layers 21B may contain a conductive agent, a binder and/or the like as needed.

As a cathode material capable of occluding and releasing lithium, a lithium-containing compound can be mentioned, for example. With the lithium-containing compound, a high energy density can be obtained. The lithium-containing compound can be, for example, a lithium composite oxide containing lithium and a transition metal element, or a phosphate compound containing lithium and a transition metal element. As the transition metal element, at least one of cobalt, nickel, manganese and iron can be mentioned in particular. With such a lithium-containing compound, a still higher voltage can be obtained. Its chemical formula can be represented, for example, by $Li_xM1O_2$ or $Li_yM2PO_4$. In these chemical formulas, M1 and M2 represent one or more transition metal elements. The values of x and y differ depending on the charge-discharge state of the battery, but in general, $0.05 \le x \le 1.10$ and $0.05 \le y \le 1.10$.

The lithium composite oxide containing lithium and the transition metal element can be, for example, a lithium-cobalt composite oxide ($Li_xCoO_2$), lithium-nickel composite oxide ($Li_xNiO_2$), lithium-nickel-cobalt composite oxide ($Li_xNi_{(1-z)}Co_zO_2(z<1)$), or lithium-nickel-cobalt-manganese composite oxide ($Li_xNi_{(1-v-w)}Co_vMn_wO_2(v+w<1)$); a lithium-manganese composite oxide ($LiMn_2O_4$) having the spinel structure; or the like. Among these, a nickel-containing, lithium composite oxide is preferred. With such a nickel-containing, lithium composite oxide, a high capacity can be obtained, and also, excellent cycling characteristics can be obtained. As the phosphate compound containing lithium and the transition metal element, on the other hand, a lithium-iron-phosphate compound ($LiFePO_4$) or lithium-iron-manganese-phosphate compound ($LiFe_{(1-u)}Mn_uPO_4$ ($u<1$)), for example, can be mentioned.

In addition, an oxide such as titanium oxide, vanadium oxide or manganese dioxide, a disulfide such as iron disulfide, titanium disulfide or molybdenum disulfide, a chalcogenated compound such as niobium selenide, sulfur, or a conductive polymer such as polyaniline or polythiophene can also be mentioned, for example.

In the anode 22, anode active material layers 22B are arranged, for example, on both sides of an anode current collector 22A having the opposite sides in pair. It is to be noted that an anode active material layer 22B may be arranged on only one side of the anode current collector 22A. The anode current collector 22A is made of a metal material such as, for example, copper (Cu), nickel or stainless steel. The anode active material layers 22B contain, as an anode active material, an anode material capable of occluding and releasing lithium as the electrode reactant, and in addition, may contain a conductive agent, a binder and/or the like as needed.

The anode active material layers 22B are composed of one of the porous carbon materials described in Example 1 to Example 4. With the use of one of the porous carbon materials described in Example 1 to Example 4, the changes in crystalline structure, which occur upon charging and discharging, can be controlled to very little, thereby making it possible to obtain a high energy density. Moreover, the acceptability of lithium is high and the deposition of lithium is inhibited, so that the reduction in discharge capacity can be suppressed. Owing to these, improvements can be achieved in cycling characteristics and storage characteristics. It is to be noted that the anode active material layers 22B may also contain one or more anode materials, which can occlude and release lithium, together with one of the porous carbon materials of Example 1 to Example 4.

As the conductive agent, a carbon material such as graphite, carbon black or Ketjenblack can be mentioned, for example. They may be used either singly, or plural ones of them may be used in combination. As an alternative, the conductive agent can also be any metal material insofar as it is a material having electrical conductivity, a conductive polymer, or the like. As the binder, on the other hand, for example, a synthetic rubber such as a styrene-butadiene-based rubber, fluorinated rubber or ethylene-propylene-diene or a polymer material such as polyfluorinated vinylidene can be mentioned. They may be used either singly, or plural ones of them may be used in combination.

In the lithium ion secondary battery, adjustments of the amounts of the cathode active material and anode active material make the charge capacity of the anode active material greater than the charge capacity of the cathode active material so that lithium metal does not deposit on the anode 22 even at the time of full charge.

The separator 23 isolates the cathode 21 and the anode 22 from each other, and allows lithium ions to pass therethrough while preventing short-circuiting of a current due to a contact between both electrodes. The separator 23 is formed, for example, of a porous membrane made of a synthetic resin comprising polytetrafluoroethylene, polypropylene or polyethylene or the like, or a porous membrane made of ceramics, or may have a structure that two or more of these porous membranes are laminated. Among such porous membranes, a polyolefin-made, porous membrane is preferred because it is excellent in short-circuit preventing effect and can achieve an improvement in the safety of the lithium ion secondary battery owing to the shutdown effect. In particular, polyethylene is a preferred material because it can obtain the shutdown effect in a temperature range of 100° C. or higher but 160° C. or lower and is excellent in electrochemical stability. In addition, polypropylene is also preferred. Further, a resin copolymerized with polyethylene or polypropylene or a resin obtained by blending polyethylene or polypropylene can also be used insofar as the resin is provided with chemical stability. The separator 23 is impregnated with an electrolyte solution as a liquid electrolyte. In the electrolyte solution, a solvent and an electrolyte salt dissolved in the solvent are contained.

The solvent contains, for example, a nonaqueous solvent such as an organic solvent. Examples of the nonaqueous solvent can include ethylene carbonate, propylene carbonate, butylene carbonate, dimethyl carbonate, diethyl carbonate, ethyl methyl carbonate, methyl propyl carbonate, γ-butyrolactone, γ-valerolactone, 1,2-dimethoxyethane, tetrahydrofuran, 2-methyltetrahydrofuran, tetrahydropyran, 1,3-dioxolane, 4-methyl-1,3-dioxolane, 1,3-dioxane, 1,4-dioxane, methyl acetate, ethyl acetate, methyl propionate, ethyl propionate, methyl butyrate, methyl isobutyrate, methyl trimethylacetate, ethyl trimethylacetate, acetonitrile, glutaronitrile, adiponitrile, methoxyacetonitrile, 3-methoxypropionitrile, N,N-dimethylformamide, N-methylpyrrolidinone, N-methyloxazolidinone, N,N'-dimethylimidazolidinone, nitromethane, nitroethane, sulfolane, trimethyl phosphate, dimethyl sulfoxide, and dimethyl sulfoxide phosphate. These nonaqueous solvents may be used either singly, or plural ones of them may be used in combination. The solvent may preferably contain at least one nonaqueous solvent selected from the group consisting of ethylene carbonate, propylene carbonate, dimethyl carbonate, diethyl carbonate and ethyl methyl carbonate. With such a solvent, sufficient cycling characteristics are obtained. In this case, it is particularly preferred to use a mixture of a high-viscosity (high permittivity) solvent (for example, the relative permittivity e of which is 30 or higher) such as ethylene carbonate or propylene carbonate and a low-viscosity solvent (for example, the viscosity of which is 1 mPa·s or lower) such as dimethyl carbonate, ethyl methyl carbonate or diethyl carbonate. With such a mixture, the dissociation property of an electrolyte salt and the ionic mobilities are improved so that still higher effects can be obtained. It is to be noted that in addition to the above-described nonaqueous solvent, vinylene carbonate, fluoroethylene carbonate and/or the like may also be contained in the solvent.

The electrolyte salt contains, for example, one or more light metal salts such as lithium salts. The lithium salts can be, for example, lithium hexafluorophosphate (LiPF$_6$), lithium tetrafluoroborate (LiBF$_4$), lithium perchlorate (LiClO$_4$), lithium hexafluoroarsenate (LiAsF$_6$), lithium tetraphenylborate (LiB(C$_6$H$_5$)$_4$), lithium methanesulfonate (LiCH$_3$SO$_3$), lithium trifluoromethanesulfonate (LiCF$_3$SO$_3$), lithium tetrachloroaluminate (LiAlCl$_4$), dilithium hexafluorosilicate (Li$_2$SiF$_6$), lithium chloride (LiCl), and lithium bromide (LiBr). They may be used singly, or plural ones of them may be used in combination.

The content of the electrolyte salt may preferably be in a range of at least 0.3 mol/kg but at most 3.0 mol/kg based on the solvent. Outside this range, the ionic conductivity is extremely lowered, leading to a potential problem that the capacity characteristic and the like may not be obtained fully.

The lithium ion secondary battery can be fabricated, for example, as follows.

For example, the cathode active material layers 21B are first formed on both sides of the cathode current collector 21A to prepare the cathode 21. Upon formation of cathode active material layers 21B, a cathode mix which is a mixture of powder of a cathode active material, a conductive agent and a binder is dispersed in a solvent to prepare a paste-like slurry of the cathode mix. After the slurry of the cathode mix is coated on the cathode current collector 21A and is then dried, compression forming is performed. Following a similar procedure as that for the cathode 21, for example, the anode active material layers 22B are also formed on both sides of the anode current collector 22A to prepare the anode 22. Specifically, upon formation of the anode active material layers 22B, an anode mix which is a mixture of one of the porous carbon materials described in Example 1 to Example 4, a conductive agent and a binder is dispersed in a solvent to prepare a paste-like slurry of the anode mix. After the slurry of the anode mix is coated on the anode current collector 22A and is then dried, compression forming is performed.

Next, the cathode lead 25 is welded to the cathode current collector 21A, and the anode lead 26 is welded to the anode current collector 22A. Subsequently, the cathode 21 and anode 22 are rolled with the separator 23 interposed therebetween to form the rolled electrode stack 20. After the cathode lead 25 is welded at an end portion thereof to the safety valve mechanism 15 and the anode lead 26 is welded at an end portion thereof to the battery can 11, the rolled electrode stack 20 is accommodated inside the battery can 11 while holding it between the paired insulating plates 12, 13. An electrolyte solution is then charged into the battery can 11 to have the separator 23 impregnated with the electrolyte solution. Finally, the battery cover 14, safety valve mechanism 15 and positive temperature coefficient device 16 are fixed in the open end portion of the battery can 11 by staking them by way of the gasket 17. In this manner, the lithium ion secondary battery depicted in FIG. 8 and FIG. 9 can be completed.

In the lithium ion secondary battery, when charging is performed, lithium ions are released, for example, from the cathode 21 and are occluded in the anode 22 via the electrolyte solution. When discharging is performed, on the other hand, lithium ions are released, for example, from the anode 22 and are occluded in the cathode 21 via the electrolyte solution.

As the anode active material is composed of one of the porous carbon materials of Example 1 to Example 4 in the lithium ion secondary battery, excellent characteristics are obtained.

Example 6

Example 6 relates to the adsorbent according to the present invention. In Example 6, a porous carbon material [a plant-derived material as a raw material for the porous carbon material was the same rice husk as in Example 1 (grown in Kagoshima Prefecture, rice husk of Isehikari variety)] was applied as a porous carbon material for selectively adsorbing various unnecessary molecules in the body. With respect to various substances, their adsorbed amounts per unit weight of the porous carbon material were measured.

Upon measurement of the adsorbed amounts, using four substances of different number average molecular weights, creatinine (number average molecular weight: 131), alizarin cyanine green (number average molecular weight: 623), lysozyme (number average molecular weight: 14,307), albumin (number average molecular weight: approx. 66,000), and a phosphate buffer of pH 7.3, solutions (aqueous solution A, aqueous solution B, aqueous solution C, aqueous solution D) of the concentrations shown below in Table 5 were prepared. It is to be noted that the concentrations of the respective aqueous solutions before adsorption were determined as desired. To each of aliquots (40.0 mL) of the thus-prepared solutions, the porous carbon material (0.010 g) was added, followed by shaking at 37±2° C. for 1 hour. Subsequent to the shaking, the porous carbon material was removed from the solution by using a polytetrafluoroethylene-made membrane filter having 500-µm pores. The absorbance of the filtrate was measured by a UV-visible absorbance measurement to determine the molar concentration of the aqueous solution. By a comparison with the molar concentration of the initial aqueous solution before the adsorption, the adsorbed amount was calculated. The adsorbed amount per gram of the porous carbon material was calculated based on the following formula.

(Adsorbed amount per gram of porous carbon material)=(molecular weight of solute)×[(molar concentration of aqueous solution before adsorption)−(molar concentration of aqueous solution after adsorption))/(amount of porous carbon material per 1,000 mL)

In Example 6, the porous carbon materials shown below in Table 6 were produced. It is to be noted that Example 6-1 in Table 6 is a porous carbon material produced by the same procedure as in Example 1 (except that the carbonization temperature and the carbonization time were set at 800° C. and 1 hour, respectively) and that in Example 6-2, Example 6-3, Example 6-4 and Example 6-5, the activation treatments shown in Table 6 were applied to the porous carbon material of Example 6-1, respectively. It is also to be noted that in Example 6-2, a microstructure was allowed to develop with volatile components and carbon molecules in the porous carbon material by using oxygen as an activator and heating the porous carbon material at 900° C. for 2 hours in air. In Example 6-3 to Example 6-5, on the other hand, microstructure were allowed to develop with volatile components and carbon molecules in the porous carbon material by using steam as an activator and heating the porous carbon material at 900° C. for 30 minutes, 1 hour and 2 hours, respectively, under a steam atmosphere. The measurement results of specific surface area and the measurement results of pore volume are also shown in Table 6. It is appreciated from Table 6 that in Example 6-3 to Example 6-5, the value of specific surface area and the value of pore volume increased with the time of the activation treatment.

For reference, using the activated carbons shown below in Table 7, adsorbed amounts per gram were also measured as Referential Example 6-1, Referential Example 6-2, Referential Example 6-3 and Referential Example 6-4.

TABLE 5

| Solute | | Molecular weight of solute | Molar weight of concentration (mol/L) |
|---|---|---|---|
| Aq. soln. A | Creatinine | 131 | $3.567 \times 10^{-4}$ |
| Aq. soln. B | Alizarin cyanine green | 623 | $7.774 \times 10^{-5}$ |
| Aq. soln. C | Lysozyme | 14307 | $8.370 \times 10^{-5}$ |
| Aq. soln. D | Albumin | 66000 | $6.533 \times 10^{-5}$ |

TABLE 6

| Example | Treatment after acid treatment | Specific surface area ($m^2/g$) | Pore Volume ($cm^3/g$) |
|---|---|---|---|
| 6-1 | None | 589 | 0.60 |
| 6-2 | Air-activated 900° C. × 2 hours | 951 | 1.68 |
| 6-3 | Steam-activated 900° C. × 30 minutes | 727 | 0.63 |
| 6-4 | Steam-activated 900° C. × 1 hour | 836 | 0.66 |
| 6-5 | Steam-activated 900° C. × 2 hours | 930 | 0.80 |

TABLE 7

| Ref. Ex. | Product Name | Manufacturer | Raw material | Specific surface area ($m^2/g$) | Pore volume ($cm^3/g$) |
|---|---|---|---|---|---|
| 6-1 | Activated carbon | Wako Pure Chemical Industries Ltd. (trade mark) | Petroleum pitch | 1231 | 0.57 |
| 6-2 | Activated carbon (KURARAY COAL YP-17D) | Kuraray Chemical Co., Ltd. | Coconut shell | 1584 | 0.79 |
| 6-3 | Activated carbon (KURARAY COAL GW) | Kuraray Chemical Co., Ltd. | Coconut shell | 885 | 0.40 |
| 6-4 | KREMEZIN (primary component) | Kureha Corporation | Petroleum Pitch | 1079 | 0.60 |

The adsorbed amounts (g) of creatinine, adsorbed amounts (g) of alizarin cyanine green, adsorbed amounts of lysozyme (g) and adsorbed amounts of albumin (g) per gram of the porous carbon material or activated carbon are shown below in Table 8, Table 9, Table 10 and Table 11.

Adsorbed amounts (g) of creatinine per gram of the porous carbon material or the like Number average molecular weight of creatinine: 131

TABLE 8

|  | Adsorbed amount of creatinine (g) | Specific surface area(m²/g) | Pore volume (cm³/g) |
|---|---|---|---|
| Ex. 6-1 | 9.41 | 589 | 0.60 |
| Ex. 6-3 | 9.13 | 727 | 0.63 |
| Ex. 6-4 | 18.01 | 836 | 0.66 |
| Ex. 6-5 | 28.62 | 930 | 0.80 |
| Ref. Ex. 6-1 | 43.31 | 1231 | 0.57 |
| Ref. Ex. 6-2 | 28.00 | 1584 | 0.79 |
| Ref. Ex. 6-3 | 12.18 | 885 | 0.40 |
| Ref. Ex. 6-4 | 16.88 | 1079 | 0.60 |

Adsorbed amounts (g) of alizarin cyanine green p gram of the porous carbon material or the like Number average molecular weight of alizarin cyanine green: 623

TABLE 9

|  | Adsorbed amount of alizarin cyanine green (g) | Specific surface area(m²/g) | Pore volume(cm³/g) |
|---|---|---|---|
| Ex. 6-1 | 104.18 | 589 | 0.60 |
| Ex. 6-3 | 162.26 | 727 | 0.63 |
| Ex. 6-4 | 177.18 | 836 | 0.66 |
| Ex. 6-5 | 201.18 | 930 | .0.80 |
| Ref. Ex. 6-1 | 82.82 | 1231 | 0.57 |
| Ref. Ex. 6-3 | 47.62 | 885 | 0.40 |
| Ref. Ex. 6-4 | 56.42 | 1079 | 0.60 |

Adsorbed amounts (g) of lysozyme per gram of the porous carbon material or the like Number average molecular weight of lysozyme: 14,307

TABLE 10

|  | Adsorbed amount of lysozyme (g) | Specific surface area (m²/g) | Pore volume (cm³/g) |
|---|---|---|---|
| Ex. 6-1 | 214.36 | 589 | 0.60 |
| Ex. 6-2 | 488.96 | 951 | 1.68 |
| Ex. 6-3 | 179.92 | 727 | 0.63 |
| Ex. 6-4 | 179.57 | 836 | 0.66 |
| Ex. 6-5 | 190.23 | 930 | 0.80 |
| Ref. Ex. 6-1 | 84.02 | 1231 | 0.57 |
| Ref. Ex. 6-2 | 109.54 | 1584 | 0.79 |
| Ref. Ex. 6-3 | 91.66 | 885 | 0.40 |
| Ref. Ex. 6-4 | 58.23 | 1079 | 0.60 |

Adsorbed amounts (g) of albumin per gram of the porous carbon material or the like Number average molecular weight of albumin: 66,000

TABLE 11

| X | Adsorbed amount of albumin (g) | Specific surface area (m²/g) | Pore volume (cm³/g) |
|---|---|---|---|
| Ex. 6-1 | 524.21 | 589 | 0.60 |
| Ex. 6-2 | 516.95 | 951 | 1.68 |
| Ex. 6-3 | 95.09 | 727 | 0.63 |
| Ex. 6-4 | 313.54 | 836 | 0.66 |
| Ex. 6-5 | 136.96 | 930 | 0.80 |
| Ref. Ex. 6-1 | 385.41 | 1231 | 0.57 |
| Ref. Ex. 6-2 | 181.71 | 1584 | 0.79 |
| Ref. Ex. 6-3 | 1.39 | 885 | 0.40 |
| Ref. Ex. 6-4 | 475.93 | 1079 | 0.60 |

It was recognized from Table 8 that in each of Example 6-1, Example 6-3, Example 6-4 and Example 6-5, the adsorbed amount of creatinine per gram of the porous carbon material tended to increase with the value of specific surface area and the value of pore volume of the porous carbon material, and moreover, a good correlation was observed therebetween. In each of the referential examples, on the other hand, no good correlation was observed between the adsorbed amount of creatinine per gram of the activated carbon and the value of specific area and the value of pore volume of the activated carbon probably due to the difference in the production procedure.

It was also recognized from Table 9 that in each of Example 6-1, Example 6-3, Example 6-4 and Example 6-5, the adsorbed amount of alizarin cyanine green per gram of the porous carbon material tended to increase with the value of specific surface area and the value of pore volume of the porous carbon material, and moreover, a good correlation was observed therebetween. Further, the examples showed greater adsorbed amounts than the referential examples.

In addition, from Table 10, the adsorbed amount of lysozyme per gram of the porous carbon material remained substantially at a constant value without depending much on the value of specific surface area and the value of pore volume of the porous carbon material in Example 6-1, Example 6-3, Example 6-4 and Example 6-5. Further, the examples showed greater adsorbed amounts than the referential examples. Example 6-2 showed a significantly large adsorbed amount compared with the other examples and the referential examples.

Moreover, from Table 11, the adsorbed amount of albumin per gram of the porous carbon material did not depend on the value of specific surface area and the value of pore volume of the porous carbon material in Example 6-1, Example 6-2, Example 6-3, Example 6-4 and Example 6-5. The porous carbon materials of Example 6-1 and Example 6-2 showed significantly great adsorbed amounts. Further, Example 6-1 and Example 6-2 showed greater adsorbed amounts than the referential examples.

Based on the results shown in Table 8 to Table 11, the standardized values of the adsorbed amount of creatinine, adsorbed amount of alizarin cyanine green, adsorbed amount of lysozyme and adsorbed amount of albumin, said standardized values having been obtained assuming that the adsorbed amounts per gram of the primary component of KREMEZIN of Referential Example 6-4 were "1.0," are shown in Table 12. It is appreciated from Table 12 that the porous carbon material of Example 6 effectively adsorbs organic substances the number average molecular weights of which are $1 \times 10^3$ to $1 \times 10^4$ in particular.

TABLE 12

|  | Adsorbed amount of creatinine | Adsorbed amount of alizarin cyanine green | Adsorbed amount of lysozyme | Absorbed amount of albumin |
|---|---|---|---|---|
| Number average molecular weight, $M_n$ | 133 | 623 | 14307 | 66000 |
| Ex. 6-1 | 0.56 | 1.85 | 3.68 | 1.10 |
| Ex. 6-5 | 1.70 | 3.57 | 3.27 | 0.29 |
| Ref. Ex. 6-1 | 2.57 | 1.47 | 1.44 | 0.81 |
| Ref. Ex. 6-4 | 1.0 | 1.0 | 1.0 | 1.0 |

As has been described above, it has been found that the molecule adsorption characteristics of each porous carbon material differ depending on the differences of the porous carbon material in its parameters such as specific surface area and pore volume, the differences of the porous carbon material in its physical surface conditions and chemical surface conditions, the differences of chemical interaction between the porous carbon material and the adsorbed material, and the differences of the porous carbon material in its production procedure. Further, a difference was observed especially between the behavior of a porous carbon material upon adsorption of molecules having a small molecular weight and the behavior of the porous carbon material upon adsorption of molecules having a large molecular weight. It has been found that compared with the activated carbons of the comparative examples, the porous carbon materials according to the present invention adsorb substances having medium molecular weights or large molecular weights still better. By determining the correlations between the molecular weight of molecules to be adsorbed and the parameters, such as specific surface area and pore volume, and production procedure of a porous carbon material on the basis of various tests, molecules can, therefore, be selectively adsorbed by the porous carbon material. Therefore, the adsorbent according to the present invention is expected to bring about significant advantageous effects in various medical applications which require adsorption.

Example 7

Example 7 relates to the carrier according to the present invention for carrying a drug thereon. In Example 7, a porous carbon material [a plant-derived material as a raw material for the porous carbon material was the same rice husk as in Example 1 (grown in Kagoshima Prefecture, rice husk of Isehikari variety)] was used as a carrier for a drug in a drug release preparation that can appropriately control the release rate of the drug. And, the release rate of ibuprofen (a non-steroidal anti-inflammatory drug, NSAID) was measured.

Specifically, the porous carbon material (0.10 g) obtained by the same procedure as in Example 1 (except that the carbonization temperature and carbonization time were set at 800° C. and 1 hour, respectively) was immersed overnight in a 0.10 g:10 mL solution of ibuprofen and hexane. Subsequently, filtration was conducted by a membrane filter, followed by vacuum drying at 40° C. The resulting complex of the porous carbon material and ibuprofen was mixed in a phosphate buffer (pH 7.3; 40 mL), and the concentrations of ibuprofen at respective times were measured by ultraviolet spectroscopy and were then calculated. It is to be noted that the value of specific surface area and the value of pore volume of the porous carbon material of Example 7 are as shown under Example 6-1 in Table 6.

Using the activated carbon (0.10 g) of Referential Example 6-1 shown in Table 7, an activated carbon-ibuprofen complex was obtained by the same procedure as in Example 7. As Comparative Example 7, the resulting activated carbon-ibuprofen complex was mixed in a phosphate buffer (pH 7.3; 40 mL), and the concentrations of ibuprofen at respective times were measured by ultraviolet spectroscopy and were then calculated. It is to be noted that the value of specific surface area and the value of pore volume of the activated carbon are as shown below.

|  | Porous carbon material of Example 7 | Activated carbon of Comparative Example 7 |
| --- | --- | --- |
| Specific surface area: | 589 m$^2$/g | 1321 m$^2$/g |
| Pore volume: | 0.60 cm$^3$/g | 0.57 cm$^3$/g |

The measurement results of the concentrations of ibuprofen at respective times are shown in FIG. 10. It is appreciated that compared with Comparative Example 7, the released amount of ibuprofen was large in Example 7.

Example 8

Example 8 relates to the mask and adsorbing sheet according to the present invention. In Example 8, a porous carbon material [a plant-derived material as a raw material for the porous carbon material was the same rice husk as in Example 1 (grown in Kagoshima Prefecture, rice husk of Isehikari variety)] was applied as an adsorbent to an anti-pollinosis mask. A schematic of the anti-pollinosis mask is shown in FIG. (A) of FIG. 11, and the schematic cross-sectional structure of a main part (adsorbing sheet) of the anti-pollinosis mask is illustrated in FIG. (B) of FIG. 11. The main part of the anti-pollinosis mask has a structure that the porous carbon material in the form of a sheet is held between a nonwoven fabric and another nonwoven fabric both of which are made of cellulose. To prepare the porous carbon material of Example 1 in the form of the sheet, it is possible to adopt, for example, such a method that forms a carbon-polymer complex with carboxynitrocelluose being used as a binder. On the other hand, the adsorbing sheet of Example 8 is formed of a sheet-shaped member, which is made of the porous carbon material produced from the same rice husk as in Example 1 (specifically, a carbon-polymer complex containing carboxynitrocellulose as a binder), and a support member supporting the sheet-shaped member thereon (specifically, nonwoven fabrics which as a support member, hold the sheet-shaped member therebetween). By applying the porous carbon material according to the present invention as an adsorbent to various masks such as an anti-pollinosis mask, the masks are considered to be able to effectively adsorb pollen, for example, by adsorbing the pollen at protein sites thereof on the porous carbon material.

The present invention has been described above based on the preferred examples. The present invention is, however, not limited to these examples, and various modifications are feasible. In the examples, the descriptions were made about the cases each of which employed rice husk, straw, reed or seaweed stem as a raw material for the porous carbon material. However, other plants may also be employed as raw materials. Examples of such other plants can include vascular plants, ferns and mosses which grow on land, algae, seaweeds, and the like. They may be used singly or plural ones of them may be used in combination.

Concerning the porous carbon material according to the present invention, adequate ranges have also been described as to its specific surface area based on the nitrogen BET method and the contents of various elements. The description, however, does not completely negate the possibility that the value of specific surface area or the contents of various elements may fall outside the above-described ranges. In other words, the above-described adequate ranges are absolutely the ranges which are particularly preferred to bring about the advantageous effects of the present invention. The value of specific surface area or the like may, therefore, somewhat depart from the above-described range insofar as the advantageous effects of the present invention can be obtained.

Further, the description has been made taking, as an example, a lithium ion secondary battery as one application example of the porous carbon material according to the present invention. The application of the porous carbon material according to the present invention is, however, not necessarily limited to batteries, and can be applied to electrochemical devices other than batteries. For example, electric double layer capacitors and the like can be mentioned. The description has also been made about the cases in which lithium was used as an electrode reactant. However, other Group-1A elements such as sodium and potassium and Group-2A elements such as magnesium and calcium in the short-form periodic table, and light metals such as aluminum may also be used. In such cases, the porous carbon material according to the present invention can also be used as an anode active material.

In addition, the porous carbon material described in Example 6-1 can be applied to Example 5 and Example 8, the porous carbon materials described in Example 6-2, Example 6-3, Example 6-4 and Example 6-5 and subjected to the respective activation treatments can be applied to Example 5, Example 7 and Example 8, the porous carbon materials described in Example 1 to Example 4 can be applied to Example 6 and Example 7, and the porous carbon materials described in Example 2 to Example 4 can be applied to Example 8.

In the plant-derived material for the porous carbon material according to the present invention, silicon is contained at 5 wt % or more. By conducting carbonization at a temperature in the range of from 800° C. to 1,400° C. upon converting the plant-derived material into a porous carbon material precursor or a carbonaceous material through carbonization in such a temperature range, the silicon contained in the plant-derived material is not converted into silicon carbide (SiC) but is converted into silicon components (oxidized silicon compounds) such as silicon dioxide ($SiO_x$), silicon oxide and silicon oxide salts. As a result of elimination of the silicon components (the oxidized silicon compounds) such as the silicon dioxide, the silicon oxide and the silicon oxide salts in the next step by the treatment with the acid, or alkali(base), a large value of specific surface area as determined by the nitrogen BET method can be obtained accordingly. Further, the carbonization at a temperature in this range provides non-graphitizable carbon, thereby making it possible to obtain excellent cycling characteristics when employed in electrochemical devices.

In the porous carbon material according to the present invention, the value of specific surface area as determined by the nitrogen BET method is 10 $m^2/g$ or more, the content of silicon is 1 wt % or lower, and the volume of pores as determined by the BJH method or MP method is 0.1 $cm^3$ or more. Excellent functionality is therefore available. As a result, excellent characteristics can be obtained when the porous carbon material according to the present invention is used in an electrochemical device such as, for example, a battery like a lithium ion secondary battery (nonaqueous electrolyte secondary battery) or an electric double layer capacitor. According to the process of the present invention for the production of the porous carbon material, on the other hand, the porous carbon material is also provided with excellent functionality. When employed, for example, in an electrochemical device such as a battery like a lithium ion secondary battery (nonaqueous electrolyte secondary battery) or an electric double layer capacitor, superb characteristics can be obtained. In addition, the porous carbon material according to the present invention is optimal, for example, as a porous carbon material for orally-administrable adsorbent preparation, also as a porous carbon material intended to adsorb proteins or viruses, also as a porous carbon material which composes the drug release preparation capable of appropriately controlling the drug release rate, and also as an adsorbent in masks and as an adsorbent in adsorbing sheets.

The invention claimed is:

1. A carbon-polymer complex comprising:
a porous carbon material and a binder,
wherein the porous carbon material includes a material obtained from carbonization of a raw material including rice husk, the raw material having a silicon content of at least 5 wt %, the raw material is heat treated before carbonization, and the raw material is treated by an alkali treatment after carbonization to reduce the silicon content, the porous carbon material having a specific surface area of at least 10 $m^2/g$ as measured by the nitrogen BET method, a pore volume of at least 0.1 $cm^3/g$ as measured by the BJH method and MP method, and an R value of 1.5 or greater,
wherein the porous carbon material includes mesopores having pore sizes from 2 nm to 50 nm and obtained from the alkali treatment of the raw material after carbonization, the porous carbon material further includes macropores and micropores,
the R value is expressed as R=B/A, the A referring to an intensity at an intersection between the baseline of a diffraction peak of the (002) plane as obtained based on powdery X-ray diffractometry of the porous carbon material and a perpendicular line downwardly drawn from the diffraction peak of the (002) plane, and the B referring to the intensity of the diffraction peak of the (002) plane.

2. The carbon-polymer complex of claim 1, wherein the binder comprises carboxynitrocellulose.

3. The carbon-polymer complex of claim 1, wherein the carbon-polymer complex is in a form of a sheet-shaped member.

4. The carbon-polymer complex of claim 3 further comprising a support member supporting the sheet-shaped member thereon.

5. The carbon-polymer complex of claim 4, wherein the support member comprises nonwoven fabrics holding the sheet-shaped member therebetween.

6. The carbon-polymer complex of claim 1 comprising magnesium in an amount of at least 0.01 wt % and at most 3 wt %, potassium in an amount of at least 0.01 wt % and at most 3 wt %, and calcium in an amount of at least 0.05 wt % and at most 3 wt %.

7. The carbon-polymer complex of claim 1, wherein the porous carbon material has a specific surface area of at least 50 $m^2/g$ as measured by the nitrogen BET method.

8. The carbon-polymer complex of claim 1, wherein the porous carbon material has a specific surface area of at least 100 $m^2/g$ as measured by the nitrogen BET method.

9. The carbon-polymer complex of claim 1, wherein the porous carbon material has a specific surface area of at least 400 $m^2/g$ as measured by the nitrogen BET method.

10. The carbon-polymer complex of claim 1, wherein the specific surface area of the porous carbon material is up to 1500 $m^2/g$ as measured by the nitrogen BET method.

11. An adsorbent comprising the carbon-polymer complex of claim 1.

12. The adsorbent of claim 11, wherein the adsorbent is capable of adsorbing creatinine, alizarin cyanine green, lysozyme, albumin, an organic substance having a number average molecular weight of $1\times10^3$ to $1\times10^4$, and combinations thereof.

13. An adsorbing sheet comprising the carbon-polymer complex of claim 1.

14. An anti-pollinosis mask provided with an adsorbent comprising the carbon-polymer complex of claim 1.

* * * * *